(12) United States Patent
Krishnaswamy et al.

(10) Patent No.: US 7,979,801 B2
(45) Date of Patent: *Jul. 12, 2011

(54) MEDIA PRESENTATION DRIVEN BY META-DATA EVENTS

(75) Inventors: Vinay Krishnaswamy, Woodinville, WA (US); Stephane Comeau, Seattle, WA (US); Patrick Schreiber, Sammamish, WA (US); Ramraj Rajkumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

This patent is subject to a terminal disclaimer.

(21) Appl. No.: 11/428,074

(22) Filed: Jun. 30, 2006

(65) Prior Publication Data

US 2008/0005652 A1    Jan. 3, 2008

(51) Int. Cl.
*G06F 17/00* (2006.01)
*G06F 3/00* (2006.01)
(52) U.S. Cl. ........ 715/730; 715/201; 715/203; 715/700; 715/753
(58) Field of Classification Search ........... 707/E17.009; 715/201, 203, 700, 753, 730, 31, 32, 723, 715/500.1, 202; 725/41
See application file for complete search history.

(56) References Cited

U.S. PATENT DOCUMENTS

| | | | | |
|---|---|---|---|---|
| 5,404,316 A * | 4/1995 | Klingler et al. | ............ | 715/723 |
| 5,832,473 A | 11/1998 | Lee et al. | | |
| 5,852,435 A * | 12/1998 | Vigneaux et al. | ............ | 345/428 |
| 5,872,573 A | 2/1999 | Adegeest | | |
| 5,999,173 A * | 12/1999 | Ubillos | ............ | 715/724 |
| 6,081,262 A | 6/2000 | Gill | | |
| 6,160,549 A | 12/2000 | Touma et al. | | |
| 6,369,835 B1 | 4/2002 | Lin | | |
| 6,400,378 B1 * | 6/2002 | Snook | ............ | 715/716 |
| 6,408,301 B1 | 6/2002 | Patton et al. | | |
| 6,581,051 B1 | 6/2003 | Ueno | | |
| 6,928,613 B1 * | 8/2005 | Ishii et al. | ............ | 715/726 |

(Continued)

FOREIGN PATENT DOCUMENTS

GB    2 354 920 A    4/2001

OTHER PUBLICATIONS

Avid Pinnacle Studio Plus 10, Sep. 15, 2005, "Slides".*

(Continued)

*Primary Examiner* — William L Bashore
*Assistant Examiner* — David Phantana-angkool
(74) *Attorney, Agent, or Firm* — Vierra Magen Marcus & DeNiro LLP

(57) ABSTRACT

A presentation application provides for authoring and playback of multi-media presentations. Each page of the presentation may contain one or more types of media, including video, text, images and other media. A user may interact with the presentation during playback by selecting different instances of the media. Media elements of the presentation may be tagged with meta-data. Tagged media elements may generate a tag event associated with meta-data in response to being selected, perform an action when a tag event with a particular meta-data occurs, or both. When a user selects a tagged media instance during presentation playback, the tagged media generates a tag event with a particular meta-data. The application detects the tag event, determines one or more other media instances (if any) configured to perform an action upon detection of the tag event with the particular meta-data, and carries out the corresponding action.

14 Claims, 14 Drawing Sheets

U.S. PATENT DOCUMENTS

| | | | |
|---|---|---|---|
| 6,938,032 B1 | 8/2005 | Heath | |
| 6,948,124 B2 | 9/2005 | Combs et al. | |
| 7,103,840 B2* | 9/2006 | Ihara et al. | 715/726 |
| 7,418,656 B1* | 8/2008 | Petersen | 715/230 |
| 7,424,718 B2* | 9/2008 | Dutton | 719/318 |
| 7,433,497 B2 | 10/2008 | Chen | |
| 7,453,472 B2* | 11/2008 | Goede et al. | 345/634 |
| 7,526,726 B1 | 4/2009 | Skwarecki | |
| 7,703,017 B2 | 4/2010 | Mise | |
| 2002/0165721 A1 | 11/2002 | Chang | |
| 2003/0018714 A1 | 1/2003 | Mikhailov | |
| 2003/0090506 A1 | 5/2003 | Moore | |
| 2003/0222900 A1 | 12/2003 | Schramm-Apple | |
| 2004/0001106 A1 | 1/2004 | Deutscher | |
| 2004/0039934 A1 | 2/2004 | Land et al. | |
| 2004/0071453 A1 | 4/2004 | Valderas | |
| 2004/0128691 A1 | 7/2004 | Egawa | |
| 2004/0168149 A1 | 8/2004 | Nirell et al. | |
| 2004/0201610 A1 | 10/2004 | Rosen | |
| 2004/0250205 A1* | 12/2004 | Conning | 715/517 |
| 2005/0033657 A1 | 2/2005 | Herrington et al. | |
| 2005/0057560 A1 | 3/2005 | Bibr et al. | |
| 2005/0081141 A1 | 4/2005 | Jonsson | |
| 2005/0154679 A1 | 7/2005 | Bielak | |
| 2005/0246642 A1 | 11/2005 | Valderas | |
| 2006/0010217 A1 | 1/2006 | Sood | |
| 2006/0050993 A1 | 3/2006 | Stentiford | |
| 2006/0061595 A1* | 3/2006 | Goede et al. | 345/619 |
| 2006/0080610 A1 | 4/2006 | Kaminsky | |
| 2007/0282948 A1 | 12/2007 | Praino et al. | |
| 2010/0122220 A1 | 5/2010 | Ainsworth | |

OTHER PUBLICATIONS

RealPlayer Plus User Manual, 2000, 24 pages.*
Tanaka et al., "Associating and Presenting Metadata of Digital Archive Objects in Virtual Spaces as Synchronized Multimedia Content", Digital Libraries: Research and Practice, IEEE, pp. 280-287, IEEE, International Conference on Nov. 13-16, 2000, Kyoto.
Shih, et al., "A Stepwise Refinement Approach to Multimedia Presentation Designs", Systems, Man, and Cybernetics, Computational Cybernetics and Simulation, vol. 4535, pp. 117-122, 1997 IEEE International Conference on Oct. 12-15, 1997.
Yokota et al., "Multiple Dynamics View Support for Cooperative Work", Database Systems for Advanced Applications, pp. 331-338, Proceedings., 6th International Conference on Apr. 19-21, 1999.
Muller, et al., "Visualization and Interaction Techniques of the Visual Metadata Browser VisMeB", University of Konstanz, Germany, http://hci.uni-konstanz.de/downloads/fm-pk-tl-hr_iknow_2003.pdf.
Office Action dated Oct. 7, 2010, U.S. Appl. No. 11/424,744, filed Jun. 16, 2006.
Amendment dated Feb. 25, 2011, U.S. Appl. No. 11/424,744, filed Jun. 16, 2006.
Office Action dated Apr. 11, 2011, U.S. Appl. No. 11/424,744, filed Jun. 16, 2006.

* cited by examiner

MEDIA PRESENTATION DRIVEN BY META-DATA EVENTS

BACKGROUND

Slide show applications allow users to generate and display one or more images in sequence. The sequence of images forms a slide show and may have a message or theme, such as a business theme. Some slide show applications allow a user to insert media into one or more images. The media may include text, images or video and may be associated with a hyperlink. In this case, if a user viewing the presentation selects the hyperlink associated with the media, the slide show may perform a task. The task may include navigating to a particular slide, navigating to a web page, or opening up a file using an application corresponding to the file.

The scope of the interactivity provided by slide show applications is limited. An author of a slide show is constrained by structured slideshow authoring templates when generating a slide show. As such, applications for generating a slide show limit a user's choices and freedom when constructing a slide show. Further, slide shows are not suitable for interactive presentations. They are designed for one-way communication of information to an audience. Though a presenter may manipulate slide show features to enhance a slide show experience, slide show applications do not allow for much individual interactivity for members of an audience.

SUMMARY

The present technology, roughly described, provides an application for authoring and playback of multi-media presentations. A presentation may include one or more interactive pages of media. The media may include video, text, images, or other content. During playback, the application allows a user to select media in a page of the presentation. In response to receiving input, the application may change the media presented in the current page or provide a new page. A user may thereby explore new media content and navigate through different presentation pages by providing input during playback of a presentation.

Media elements of the presentation may be tagged meta-data. The elements may be considered modules which contain media. An element or module that is tagged is one that contains tag meta-data. Tagged media elements may generate a tag event in response to being selected during playback, perform an action when a tag event occurs, or both. Tag events may be differentiated from each other by tag meta-data associated with the tag. Thus, media elements may perform an action in response to a tag event that has matching meta-data. In some embodiments, other presentation objects may be associated with tags (e.g., contain meta-data associated with a tag) as well.

One embodiment includes providing an interface for authoring a presentation. The authored presentation may have two or more modules contained in at least one frame. A first tag may be selected from a list of tags through the interface in order to add the first tag to a first module. Additionally, the interface can be used to select an action for a second module. The action is configured to be performed by the second module in response to selecting the first module (or any other module having the first tag) during playback of the presentation. When selected during playback, the first module having the first tag data communicates the first tag data to an event handler as part of a triggered tag event. The event handler receives the first tag data, accesses a tag event-action table, and identifies one or more modules (e.g., the second module) configured to perform an action in response to the triggered tag event. Once identified, the one or more modules configured to perform an action in response to the tag event are called by the event handler to perform the actions.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
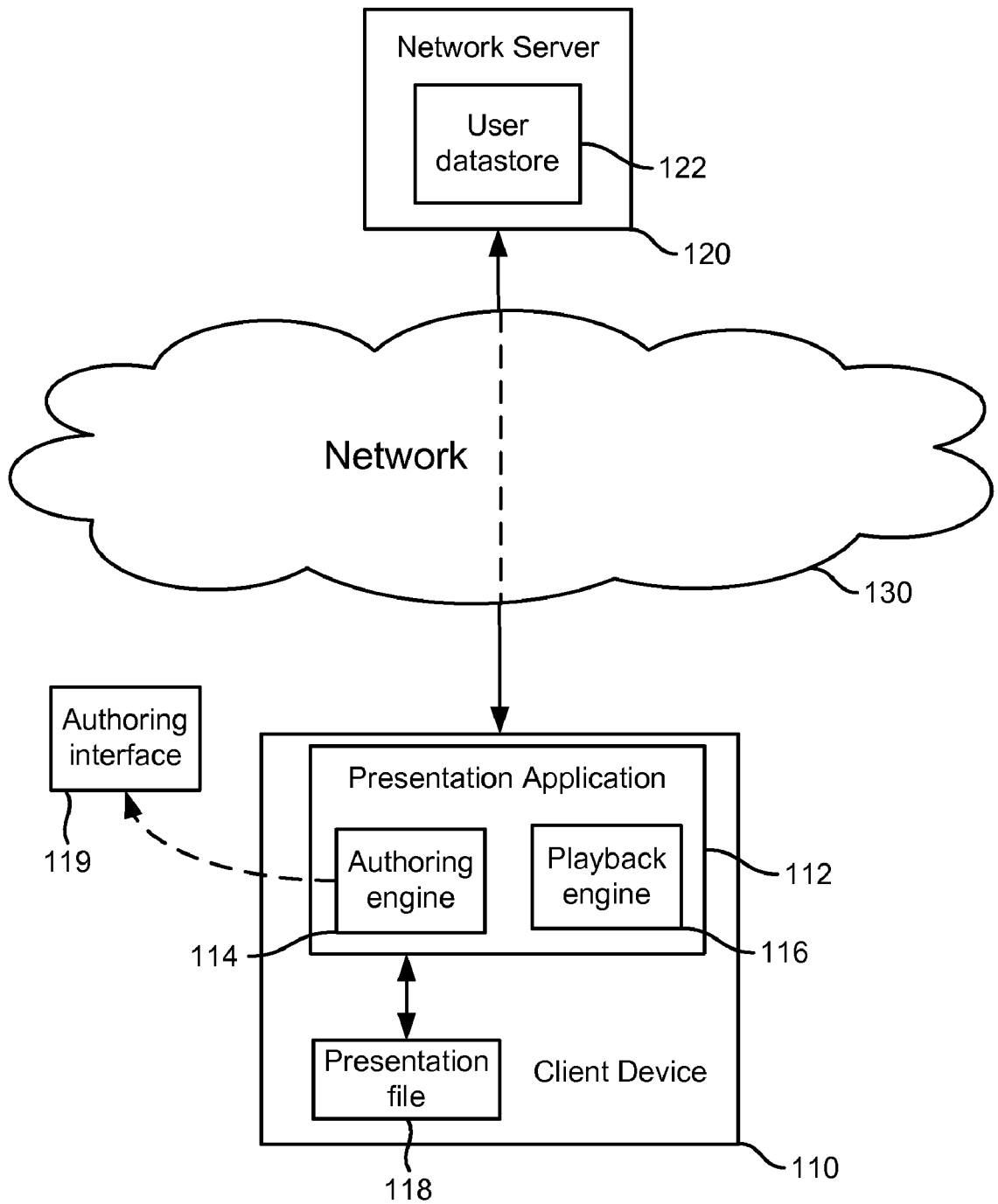
FIG. 1 is a block diagram of an embodiment of a system for providing a presentation.

An application is used to author and/or playback multi-media presentations. A presentation may include one or more interactive pages of video, text, images, or other media. During playback of a presentation, a user may select media in a page of the presentation. In response to receiving the input, the application may change the media presented in the current page of the presentation or provide a new page. A user may thereby explore the media provided in each page and/or navigate between different pages of a presentation during playback.

As discussed herein, a presentation may be comprised of one or more single page frames. Each frame may include one or more modules. Each module may consist of video, images, text or some other type of media. The media of a module may be provided to a user during playback of the presentation. In one embodiment, frames and modules are presentation objects (or objects) which comprise a presentation.

Some media elements of the presentation may be tagged with meta-data. Tagged media elements or modules may either generate a tag event in response to being selected during playback, perform an action when a particular tag event occurs, or both. Tag events are differentiated from each other by meta-data associated with each tag. In this case, media modules may perform an action in response to a tag event having a particular meta-data.

Meta-data added to a module or other presentation object may include a tag name, tag group and/or other tag data. For example, two image modules may contain an image of former United States Presidents Abraham Lincoln and George Washington, respectively. The modules may be tagged with tag name meta-data of "Lincoln" and "Washington", respectively, and each has tag group meta-data of "Presidents." User selection of either module during presentation playback would generate a tag event with tag group meta-data of "presidents." Each module would also generate a tag event with meta-data according to its corresponding tag name.

In another example, a presentation may be a multi-page history tutorial. Each page in the tutorial may be implemented as a one page frame. Each frame may comprise a portion of the tutorial and include one or more modules containing media. For example, the first frame provided to a user during presentation playback may be a greeting page. The greeting page may include text indicating the name of the history tutorial, an image associated with the subject matter of the history tutorial (e.g., for a history tutorial of American Presidents, an image of George Washington may be provided), several images of "buttons" associated with different actions that can be selected by a user from the greeting page, and text associated with each button (e.g., text that reads "new tutorial," "load saved tutorial," etc.). Upon receiving input selecting one of the buttons or other modules of the greeting page, a user may navigate to other presentation pages and proceed through the history tutorial.

A presentation object (i.e., a frame or a module) may trigger a tag event in response to a user initiated event or an internal event. User initiated events are associated with received user input, such as user input that selects a module. Internal events may include completion of a timer, loading a module or some other internal event. In some cases, an object may be able to trigger more than one event. For example, placing a cursor over a module may trigger a tag event with meta-data of "Presidents," while selecting the module with a single click of a mouse device may trigger a tag event with meta-data of "Lincoln."

An object may perform different actions in response to different tag events. The different actions may be performed in response to detecting tag events with different meta-data. For example, a module may be associated with several images, each of which may be provided as an action performed by a module. Thus, the module may provide an image of president George Washington upon detection of a tag event with meta-data of "Washington," or provide an image of president Abraham Lincoln upon detection of a tag event with meta-data of "Lincoln." Processing of tag events is discussed in more detail below.

In one embodiment, an interface is provided for authoring a presentation having two or more modules contained in at least one frame. Though the authoring interface, a user may select a first tag from a list of tags to add to a first module. A user may also select an action for a second module through the interface. The action can be performed in response to selecting the first module having the first tag during playback of the presentation. When selected during playback, the first module having the first tag communicates first tag data to an event handler as part of a triggered tag event. The event handler receives the first tag data and identifies other modules configured to perform an action in response to the tag event, such as the second module. Once identified, modules configured to perform an action in response to the tag event are called to perform the actions.

Authoring and playback of a presentation of the present technology is performed differently than the authoring and playback of slideshows in common slideshow applications. Common slide show applications allow a user to insert media into one or more pages of a slideshow. The media may include text, images or video and may be associated with a hyperlink. In this case, if a user viewing the slideshow selects the hyperlink associated with the inserted media, the slide show may navigate to a particular slide, navigate to a web page, play a video or open a file (such as a word processor file) using the native application for the file. Thus, a media element in a page of a common slideshow may be directly linked to one other media element on the page, another page in the presentation, or to a file. Slide show applications limit a user's choices and freedom when constructing a slide show and the experience provided when viewing a slideshow with this one to one direct link between elements. Unlike common slideshow applications, a presentation of the present technology does not implement a direct link between modules that are selected and those that perform an action. Rather, an event handler (frame manager 246) receives triggered event data (tag data), determines actions to be performed in response to the triggered event, and calls the actions.

In some embodiments, the present technology allows a module to be configured with tag data and trigger a tag event when selected. As a result of the tag event, tag data such as meta-data is sent from the selected module to frame manager 246. Frame manager 246 receives the tag data and accesses a table to identify modules configured to perform an action in response to the triggered tag event. In particular, frame manager 246 determines if any modules are configured to perform an action for the particular tag data received by frame manager 246. For example, if frame manager receives tag data consisting of "Washington," frame manager will check a tag event-action table to determine if any modules are configured to perform an action in response to a tag event containing the data "Washington." Once one or more modules are identified from the table, frame manager 246 sends a call to the corresponding modules for the action(s) to be performed. Thus, rather than implementing a single direct link from one module to another module or frame, the present technology allows modules to send events to frame manager 246 without any information as to what action the event will trigger. Frame manager 246 then determines what the triggered action is and calls that action. This allows for an expandable, dynamic authoring and playback system and is not limited by a single link between modules.

Additionally, the data transferred in response to a user selection in an application of the current technology differs from that of common slideshow applications. As discussed in more detail below, tag data which is sent to frame manager 246 when a module is selected may be any data entered by a user. For example, the tag data may be "country", "Washington" "my dog" or any other string of data. The tag data does not have to be a hyper link, a location or name of another module or file, or any other information which identifies another module. Though tag data is added to one or more modules, the data may be module and media independent—the data is created by a user, not derived from the module or media itself or its location.

FIG. 1 is a block diagram of an embodiment of a system for providing a presentation. The block diagram of FIG. 1 includes client device 110, network server 120 and network 130. Client device 110 includes presentation application 112 and presentation file 118. Client device 110 and network server 120 are in communication over network 130. Network 130 may be implemented as the Internet, or some other network.

Presentation application 112 includes authoring engine 114 and playback engine 116. In some embodiments, authoring engine 114 and playback engine 116 may be implemented using the same software components. An example of presentation application 112 is discussed in more detail below with the respective FIG. 2. Authoring engine 114 provides authoring interface 119, through which a user may generate and modify a presentation file (presentation file). An example of an authoring interface is discussed in more detail below with respect to FIG. 12. Playback engine 116 manages playback of a presentation. Playback of a presentation is discussed in more detail below with respect to FIG. 13A.

Presentation file 118 contains data associated with each frame and module of a presentation. In one embodiment, presentation file 118 includes data in XML format. For each frame in a presentation, the frame data may include information such as background color of the frame, the number of module slots for the frame (indicating the number of modules which are in the frame), tag meta data associated with the frame, and other data. Frame data may also include module data and media data. The module data may include data for each module contained in the particular frame. Module data may include a reference to the media content provided in the frame during playback (image file name, video file name, actual text, a URL to an image or video not contained in the presentation file or other reference), a list of actions that can be performed by the module (e.g., play video, stop video, show image, remove image) during playback, one or more events for which the module will perform an action in response to, tag meta-data configuration information, and/or other data. Tag meta data included in module data of presentation file 118 is discussed in more detail below. Media data included within a presentation file may include data for one or more images, videos, text or other media content provided in a module during playback. In some cases, the media provided by a module during playback may not be contained in a presentation file. In this case, the location of the media may be referenced in file 118. For example, media content of file 118 may be accessed from user data store 122 over network 130.

Figure 2:
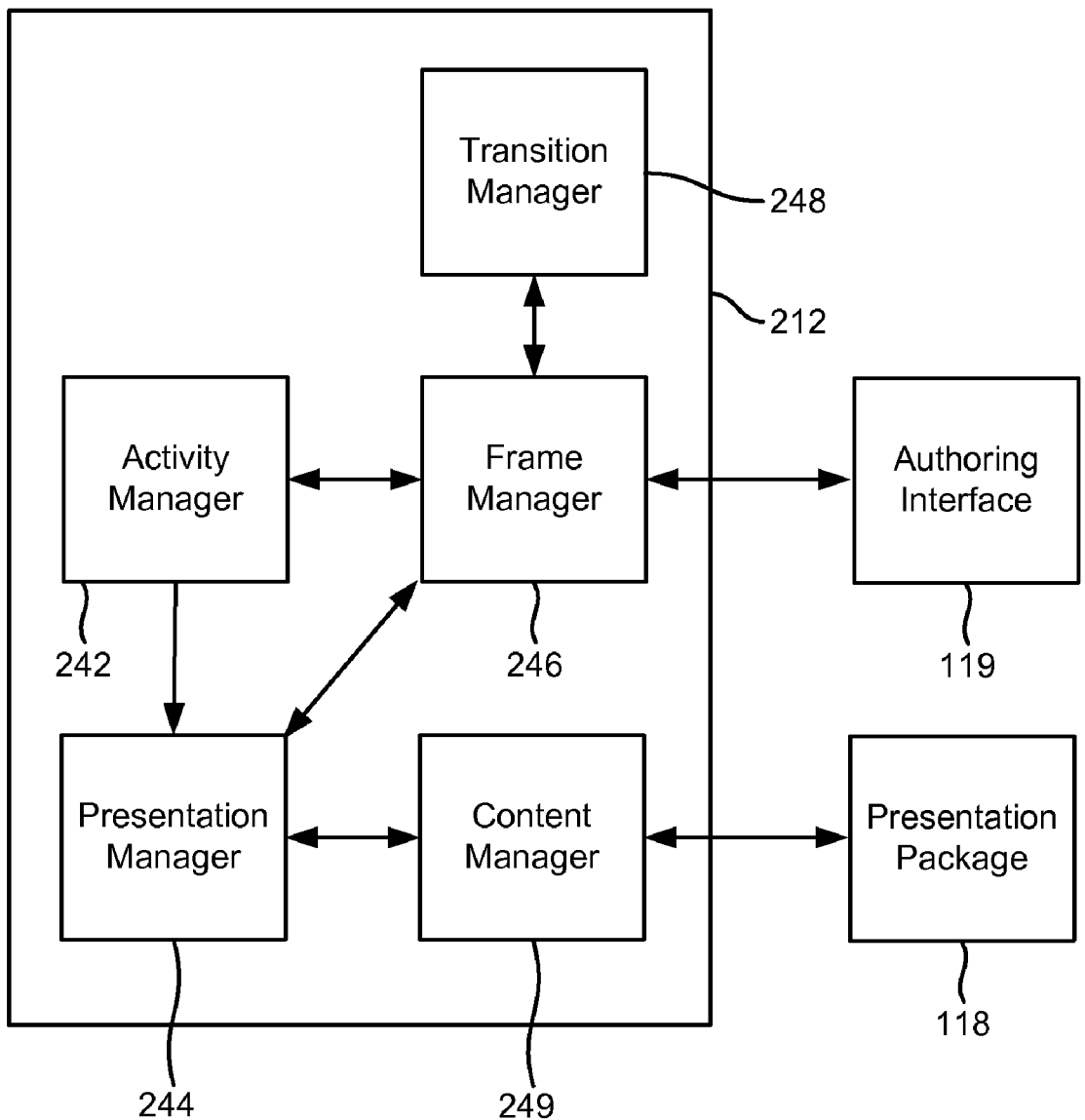
FIG. 2 is a block diagram of an example of a presentation application.

FIG. 2 is a block diagram of an example of presentation application 112. Presentation application 112 includes activity manager 242, presentation manager 244, frame manager 246, transition manager 248 and content manager 249. In one embodiment, client application 112 may communicate with authoring interface 119 through frame manager 246 and with Presentation file 118 through content manager 249.

Presentation manager 244 initializes content manager 249 and frame manager 246. Initialization of managers 249 and 246 may occur upon authoring a presentation file. In some embodiments, presentation manager 244 manages a presentation object associated with the presentation. In this case, when a new presentation file is loaded, presentation manager 244 determines a first activity (the "home" activity) and first frame within the first activity to provide during playback of the presentation. The first activity and frame is then communicated to frame manager 246. As subsequent activities are to be played, presentation manager 244 provides the activities to frame manager 246. Operation of presentation manager 244 is discussed in more detail below.

Activity manager 242 is in communication with presentation manger 244 and frame manager 246, and configures activity data for a presentation. In some embodiments, activity manager 242 also handles the execution of rules within an activity. For example, when a frame implements a quiz, and user selection of presentation modules is to be saved and processed, frame manager 242 stores the received user input and processes the input according to the rule logic. Content manager 249 stores, saves, loads and otherwise processes presentation data. In particular, content manager 249 loads a presentation file to be modified or played, retrieves information from the presentation file and provides the information to presentation manager 244.

Frame manager 246 handles frame transitions, module transitions, module tot module action-event processing, tag action and event processing and other frame tasks. In some embodiments, frame manager 246 tracks the current frame and receives frame events, module events and module state information. Receiving events may include receiving data from a presentation module, parsing the received data and calling an appropriate action on behalf of the presentation module. Because frame manager 246 processes module based events and actions and tag-based events and actions, frame manager 246 may serve as and/or be considered to operate as an event manager. Processing of module events is discussed in more detail below.

Frame manager 246 also handles processing of tag-related events and actions. Frame manager 246 determines whether a module, frame or other presentation object being loaded for display during playback is configured with a tag. If so, frame manager 246 reads the meta-data associated with the tag. After reading the meta-data associated with the tag, frame manager 246 determines that a tag event has occurred and if any presentation object is configured to perform an action in response to the tag event. In one embodiment, frame manager 246 accesses a tag event-action list to determine if any objects are configured to perform an action in response to the tag event. If so, frame manager 246 invokes the corresponding object to perform the action in response to loading the tag. Processing tag-related events and actions during playback is discussed in more detail below with respect to FIG. 13A.

Transition manager 248 handles transitions between frames in a presentation. In some embodiments, handling frame transitions includes receiving the current frame and next frame from frame manager 246, ending the presentation modules of the current frame, loading the next frame and presentation modules of the next frame, and resuming any presentation modules of the previous frame which are configured as persistent presentation modules. This is discussed in more detail below with respect to step 1365 of FIG. 13A.

Figure 3:
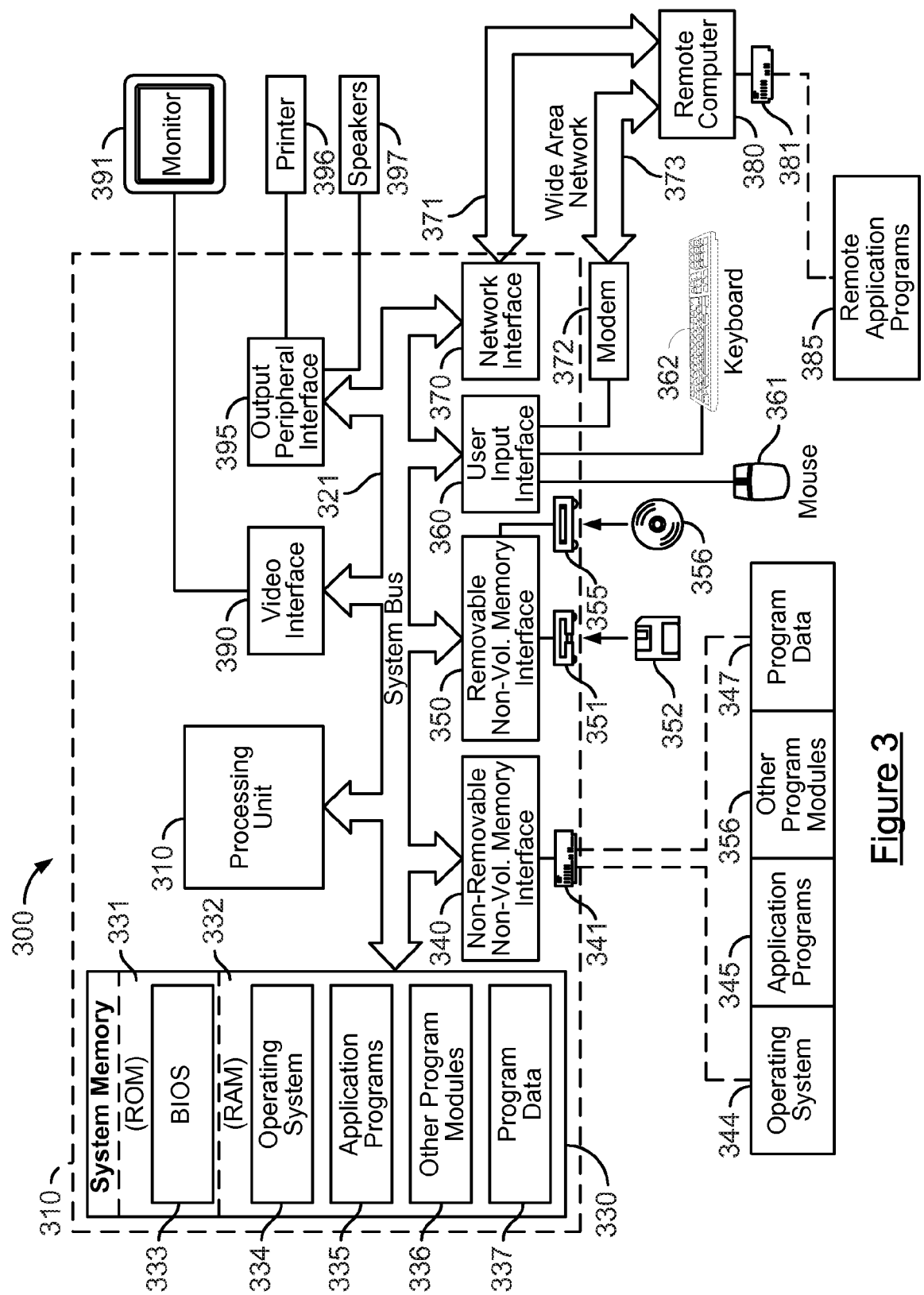
FIG. 3 is a block diagram of an embodiment of a system for implementing the present technology.

FIG. 3 illustrates an example of a suitable computing system environment 300 on which the present technology may be implemented. The computing system environment 300 is only one example of a suitable computing environment and is not intended to suggest any limitation as to the scope of use or functionality of the technology. Neither should the computing environment 300 be interpreted as having any dependency or requirement relating to any one or combination of components illustrated in the exemplary operating environment 300. The computing systems of FIG. 3 may be used to implement client device 310 and network server 320.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
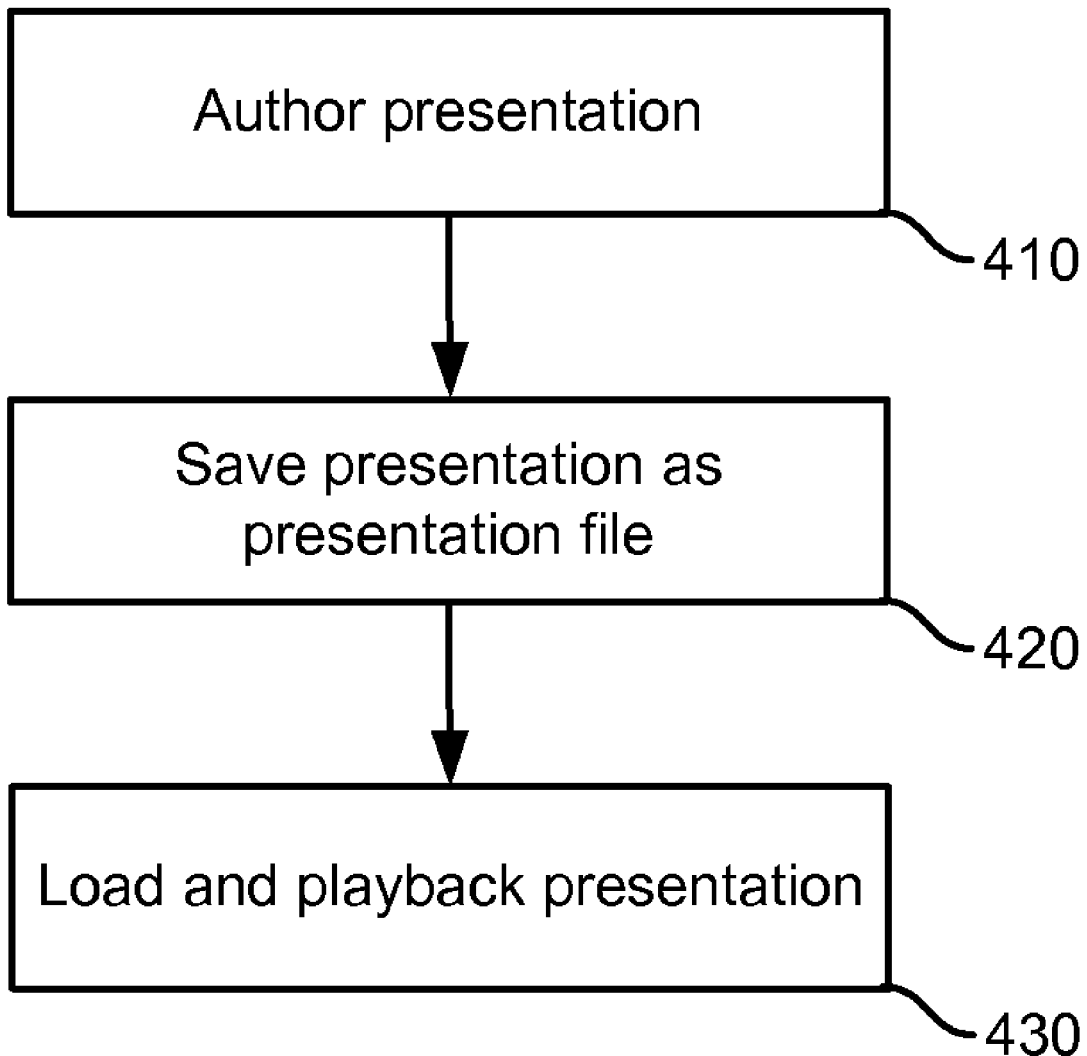
FIG. 4 is a flow chart of an embodiment of a process for authoring and playback of a presentation by a presentation application.

FIG. 4 is a flow chart of an embodiment of a process for authoring and playback of a presentation. The process of FIG. 4 may be implemented by presentation application 112 of FIG. 1. First, a presentation is authored at step 410. Authoring a presentation may include initializing authoring engine 114 of presentation application 112, loading an existing presentation or creating a new presentation, and editing the presentation. Editing a presentation may include editing presentation modules, frames, activities, and other presentation objects with media, tag related events and actions and other data. Authoring a presentation is discussed in more detail below with respect to FIG. 5.

After authoring the presentation, the presentation may be saved at step 420. In one embodiment, saving the presentation includes generating a presentation file. The presentation file may include data comprising the presentation activities, frames, modules, module to module action-event data, tag meta data, and other data. Once generated, the presentation file may be distributed such that the presentation can be played by other users.

A saved presentation file can be played at step 430. Playback of the presentation may include loading the presentation, instantiating presentation objects, and playback of the presentation by presentation application 112. During playback, presentation application 112 may receive user input selecting different modules. In response to the received user input, a user may accomplish tasks, experience media of different frames and navigate through the presentation. Presentation playback is discussed in more detail below with respect to FIG. 40.

Figure 5:
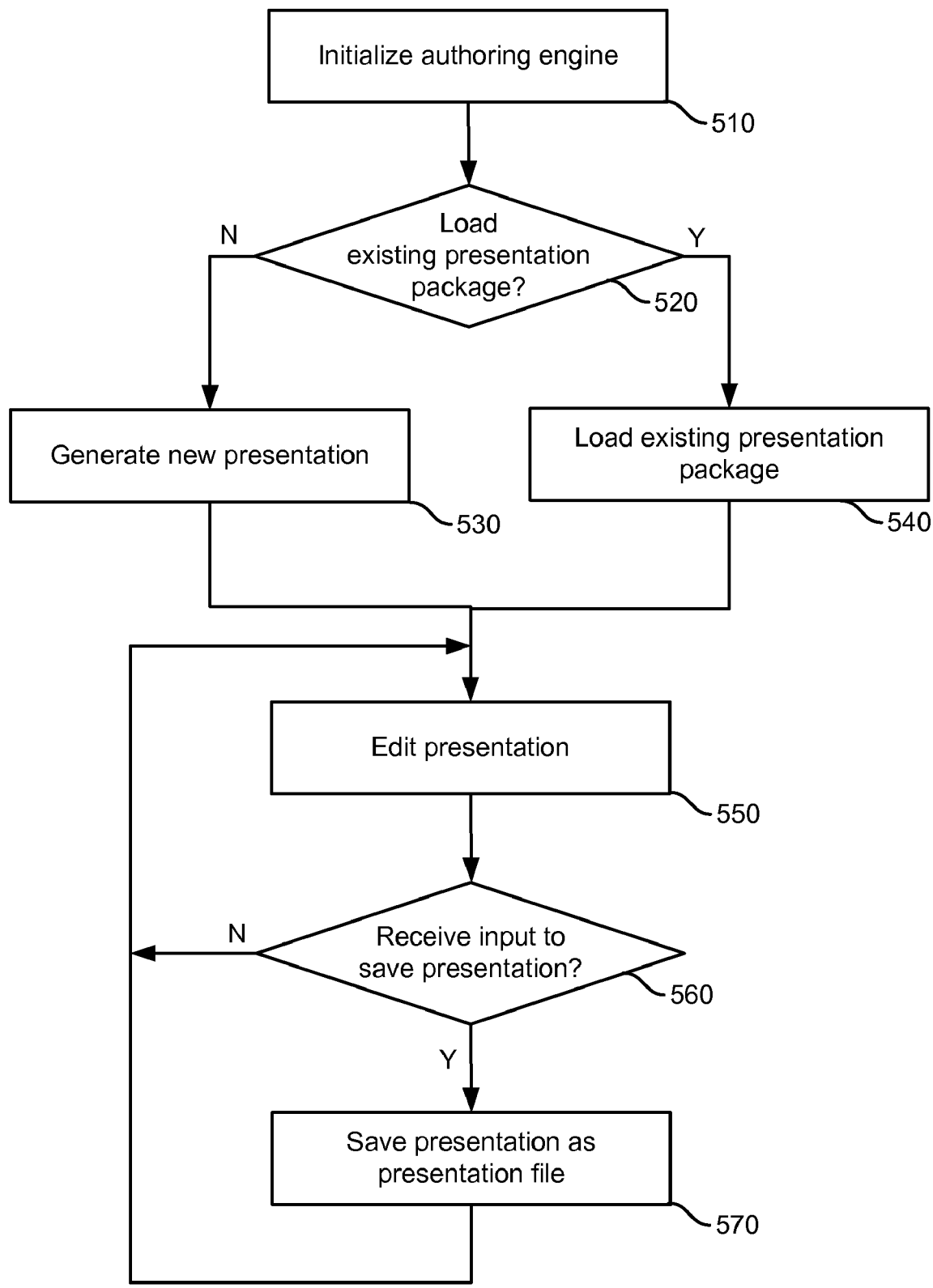
FIG. 5 is a flowchart of an embodiment of a process for authoring a presentation.

FIG. 5 is a flowchart of an embodiment of a process for authoring a presentation. The flowchart of FIG. 5 begins with initializing an authoring engine at step 510. In one embodiment, authoring engine 114 is initialized by loading presentation application 112. Loading of presentation application 112 may begin with loading of presentation manager 244. Presentation manager 244 may then initialize activity manager 242, frame manager 246 and content manager 249 of FIG. 2. Presentation manager 244 generates authoring interface 119. An example of authoring interface 119 is discussed in more detail below with respect to FIG. 12.

Next, a determination is made as to whether an existing presentation file should be loaded at step 520. In one embodiment, presentation application 112 determines if user input is received through authoring interface 119 to generate a new presentation or select an existing presentation. If a new presentation is to be generated, the flowchart of FIG. 5 continues to step 530 where the new presentation is generated. Generating a new presentation involves configuring a presentation template, configuring new activity, frame and module objects, and populating authoring interface 119 with the new objects. Generation of a new presentation is discussed in more detail below with respect to FIG. 6. After generating a new presentation, the process of FIG. 5 continues to step 550.

If an existing presentation file is to be loaded, a presentation file is loaded at step 540. In one embodiment, step 540 may include receiving input through authoring interface 119 selecting a presentation file, loading the selected file, extracting presentation data from the loaded file, and populating authoring interface 119 with presentation data from the file. Loading an existing presentation file is discussed in more detail below with respect to FIG. 7. After loading the file, the flowchart of FIG. 5 continues to step 550.

A user may edit a presentation at step 550. Editing a presentation may include adding, removing or changing presentation activities, frames or modules. Editing may also include configuring module actions and events as well as tag meta-data actions and events. A user may edit a presentation through authoring interface 119. Editing a presentation is discussed in more detail below with respect to FIG. 8.

After editing the presentation, a determination is made as to whether the presentation being edited should be saved at step 560. In some embodiments, a presentation should be saved if user input is received through authoring interface 119 indicating the presentation should be saved. In some embodiments, presentation application 112 may automatically save a presentation file in response to a timer event. If at step 560 the presentation is not to be filed, the flowchart of FIG. 5 returns to step 550 where a user may continue to edit the presentation. If the presentation is to be saved, a presentation file is generated at step 570. Presentation file 118 may include data for each activity, frame and module in the presentation as discussed above with respect to FIG. 1. After saving the presentation, the process of FIG. 5 returns to step 550.

In one embodiment, content manager 249 may collect the information needed to save the presentation and generate a presentation file. An example of the format or outline of a presentation file is below.

```
PackageFile.gxml
Activity_1_Folder
    ActivityInfo.xml
    ResourceTable.xml
    Frame_1 (Folder)
        Layout.xaml
        Video_1_Property.xml
        Game1Btn_2_Property.xml
        Game2Btn_3_Property.xml
    Frame_2 (Folder)
        Layout.xaml
        Game_4_Property.xml
    Back_Persist_Frame (Folder)
        Layout.xaml
        Game_5_property.xml
    Front_Persist_Frame (Folder)
        Layout.xaml
        Button_6_property.xml
    Resources (Folder)
        VideoFileToPlay.mpg
        Img1_resxId2.png
        Img1_resxId3.png
```

The PackageFile.gxml file is the main manifest file for the presentation. The Activity_Info.xml portion of the file contains data for an activity. The Layout.xaml file contains layout data for a frame, such as the number of modules in the frame, the position of the modules, a background color of the frame, and other data. The Video_1_Property.xml, GameBtn_2_Property.xml and Game2Btn_3_Property.xml files contain information specific to their corresponding presentation modules, such as identification of the media to present in the module, actions able to be performed by the module, events which when triggered the module will perform an action, meta-data associated with the module, and other data. The back and front persistent frames folders may contain data for the background and foreground of persistent frames provided throughout presentation playback. Media included in either persistent frame may include header and/or footer data to be provided throughout a presentation, background or foreground color information, and other data. The resources folder file contains a list of resources required for the activities of the presentation. For example, the resources folder may contain a list of videos that are included in the presentation, a reference to the images included in the modules of the presentation, and other media files.

Figure 6:
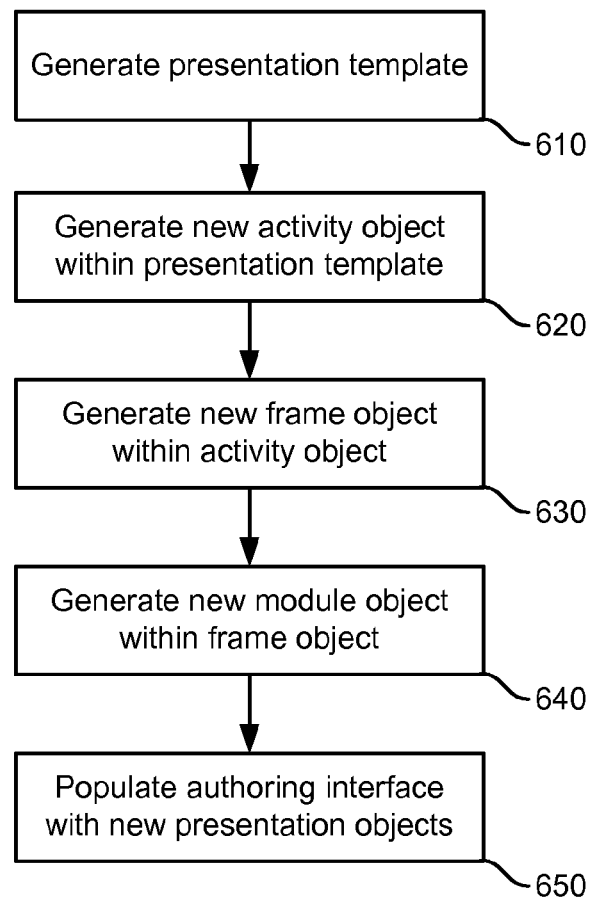
FIG. 6 is a flowchart of an embodiment of a process for generating a new presentation.

FIG. 6 is a flowchart of an embodiment of a process for generating a new presentation. In one embodiment, the flowchart of FIG. 6 provides more detail for step 530 of FIG. 5. First, a presentation template is generated at step 610. The presentation template is generated by presentation manager 244 and may include default code for a presentation. The default code may specify a default number of activity objects, frame objects and module objects to include in a new presentation, as well as default values for persistent frames and other background and foreground information. Next, a new activity object is generated within the presentation template at step 620. The generated activity object may be generated by activity manager 242 of FIG. 2. The new activity may be generated with default value parameters and other data. After generating an activity, a new frame object may be generated within the new activity object of the presentation template at step 630. In one embodiment, frame manager 246 generates the new frame object with default information, such as a default number of presentation module slots in the frame. For example, a frame object may include module wrappers and methods for adding and deleting module wrappers. A module wrapper may include code that logically "wraps around" a module object. The wrapper may intercept calls sent to and from the module object, process the calls, and forward the processed calls to their intended destination. A module may be implemented in each module wrapper. Additionally, the module wrapper class provides common authoring functionality for presentation modules, such as sizing, initiating editing features and other functions.

A new module object is generated within the new frame object at step 640. The new module object may be generated by frame manager 246 and include default data regarding module size, module position, and other data. After generating a new module, authoring interface 119 is populated with new presentation objects at step 640. Authoring interface 119 is populated with data generated in steps 610-640.

In some embodiments, a new presentation may be generated with a number of objects. These objects may be configured or maintained by content manager 249. The base object is a presentation object. The presentation object may contain the default presentation level settings and properties as well as an initial activity object. In some embodiments, the activity object represents a single activity, a collection of frame objects and a number of methods to add and delete frames. When a new presentation is provided in an authoring interface, the initial frame may be selected in a frame navigator window within an authoring interface. This is discussed in more detail below with respect to FIG. 12. Once loaded into an interface, the activity object may operate to update a frame or workspace.

Figure 7:
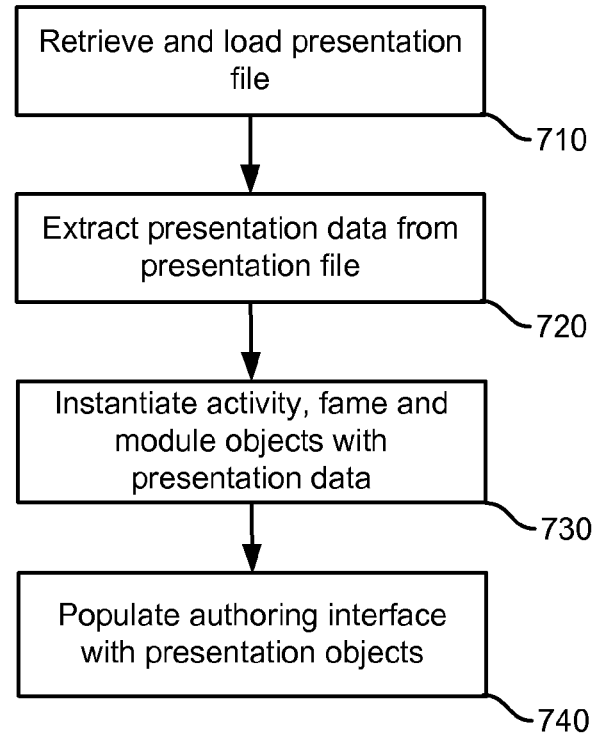
FIG. 7 is a flowchart of an embodiment of a process for loading an existing presentation package.

In some cases, rather than create a new presentation file as discussed above with respect to FIG. 6, a user of presentation application 112 may load a saved presentation file. FIG. 7 is a flowchart of an embodiment of a process for loading an existing presentation file. In one embodiment, FIG. 7 provides more detail for step 540 of FIG. 5. First, a presentation file is retrieved and loaded at step 710. A presentation file may be selected by a user through authoring interface 119. The selected presentation file is then loaded by content manager 249. Next, presentation data is extracted from the retrieved presentation file at step 720. In one embodiment, activity, frame and module data is extracted from the loaded presentation file by content manager 249.

Activity, frame and module objects are instantiated with presentation file data at step 730. The objects are instantiated by frame manager 246 with data extracted from the presentation file at step 720. Next, authoring interface 119 is populated with presentation objects at step 740. The presentation objects instantiated with the extracted presentation data at step 730 are provided to presentation manager 244, which provides the objects to frame manager 246. Presentation manager 244 and frame manager 246 then populate the authoring interface with the instantiated objects (such as activity objects, frame objects, and module wrapper objects). After authoring interface 119 is populated with presentation data, the presentation may be edited by a use through the interface.

Figure 8:
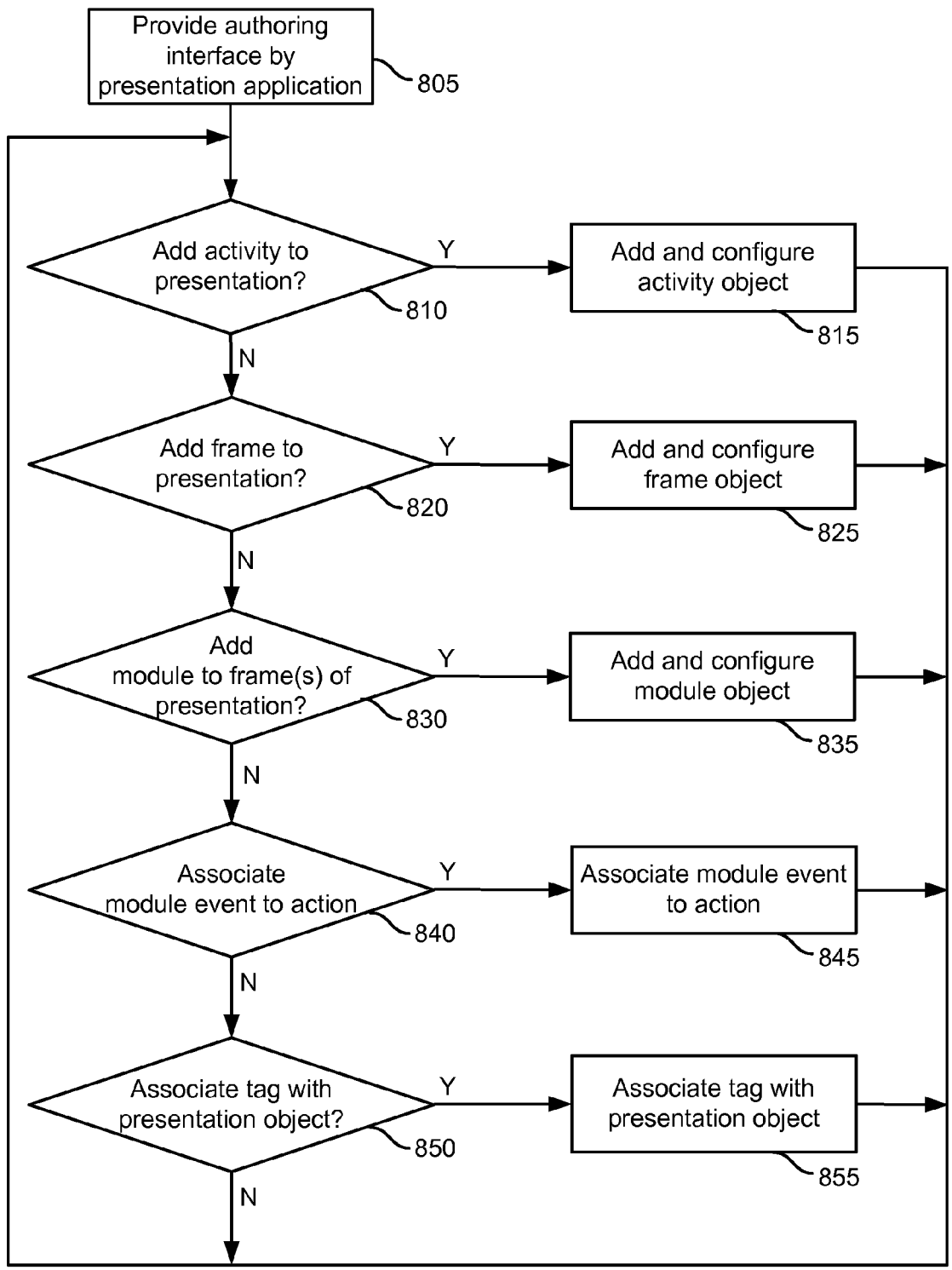
FIG. 8 is a flowchart of an embodiment of a process for modifying a presentation.

FIG. 8 is a flowchart of an embodiment of a process for modifying a presentation. The process of FIG. 8 is performed by authoring engine 314 of FIG. 1 and provides more detail for step 550 of FIG. 5. Though steps 810-840 are listed in a particular order in the flowchart of FIG. 8, they can be performed in any order.

First, authoring interface 119 is provided for authoring a presentation by presentation application 112 at step 805. Interface 119 may be populated with a new or saved presentation file as discussed above with respect to FIGS. 6-7. Next, a determination is made as to whether an activity should be added to the presentation at step 810. The determination is made by authoring engine 114 in response to user input received. In one embodiment, an activity can be added to the presentation in response to receiving user input through interface 119 selecting to add an activity. If no activity is to be added to the presentation, the process of FIG. 8 continues to step 820. If an activity should be added, an activity object is added and configured at step 815. Configuring the new activity may include storing activity parameter information, persistent presentation module information and other data. After adding and configuring the activity, the process returns to step 810.

A determination is made by authoring engine 114 as to whether a frame should be added to a presentation at step 820. If no frame should be added to a presentation, the process continues to step 830. In some embodiments, a frame should be added to a presentation if user input is received through authoring interface 119 to add a frame. If a frame should be added to a presentation, a frame object is configured at step 825. In one embodiment, configuring a new frame includes configuring a background frame, foreground frame and default frame data, such as the default number of module slots in the frame, actions that may be called on the frame, and other information. After adding and configuring a new frame, the process of FIG. 8 returns to step 810.

A determination is made by authoring engine 114 as to whether a module should be added to a frame of a presentation at step 830. In some embodiments, a module should be added to a presentation if user input is received through authoring interface 119 to add the module. If a module should be added, a module object is added and configured at step 835. Configuring a new module object may include configuring the module as persistent or not, configuring module properties such as size, cropping, position and other data, selecting events to be generated by the module, selecting default actions that the module may call on other components of the presentation, and other configurations. After adding and configuring a new module, the process of FIG. 8 returns to step 810.

A determination is made by authoring engine 114 as to whether a module event should be associated with an action at step 840. In one embodiment, an event can be associated with an action in response to user input received through authoring interface 119. Configuring an event with a module action is discussed in more detail below with respect to FIG. 10. If no event is to be associated with an action, the process continues to step 850. If an event is to be associated with an action, the module event is associated with the action at step 845. The process of FIG. 8 then returns to step 810.

A determination is made by authoring engine 114 as to whether a tag should be associated with a presentation object at step 850. The presentation object may be a presentation activity, frame, or module. Associating a tag with a presentation object may include adding tag data to a presentation object and/or configuring an object to perform an action upon a tag being loaded. Associating a tag with a presentation object is discussed in more detail below with respect to FIG. 11. If no input is received to associate a presentation object and tag, the process of FIG. 8 returns to step 810. If input is received through authoring interface 119 indicating that a tag and presentation object are to be associated together, the process of FIG. 8 continues to step 855. The association between the tag and the presentation object is configured at step 855. After associating the tag and the object at step 855, the process of FIG. 8 returns to step 810.

Figure 9:
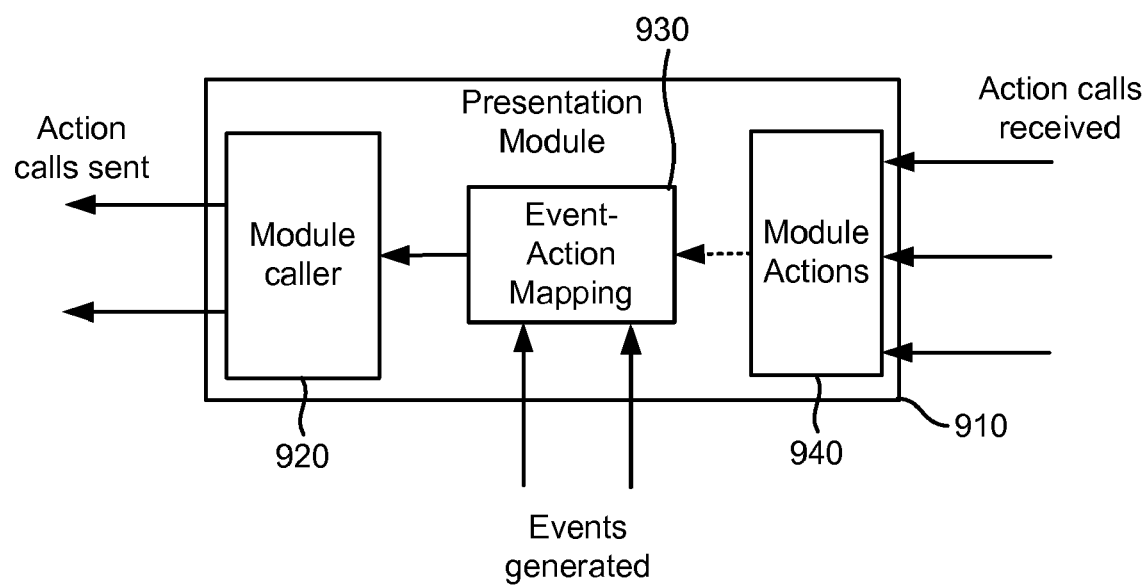
FIG. 9 is a block diagram of an embodiment of a presentation module.

FIG. 9 is a block diagram of an embodiment of presentation module logic. In one embodiment, the block diagram of FIG. 9 provides more detail of event-action logic within a presentation module. Presentation module 910 includes module actions block 940, event action mapping 930 and module caller block 920. Module actions block 940 represent actions that presentation module 910 may perform and other presentation actions may call. For examples, if module 910 consisted of a video, module actions block 940 may include module actions of "start video," "pause video," and "end video." In this case, another presentation module could call an action of "start video" for module 910. In some embodiments, a frame object maintains a list of action-event associations for the modules contained in that frame. This is discussed in more detail below with respect to FIG. 10.

Module caller 920 may call actions on other presentation modules. In some embodiments, a presentation module may include one or more methods that implement module events and actions. Module events may be triggered by internal module processes or in response to user input. Examples of user input that initiates an event includes a right click selection of the presentation module, left click selection of the presentation module, positioning a cursor over the presentation module or some other event. Examples of internally generated events include expiration of a timer, completion of a video, and other events. Triggered module events are represented in FIG. 9 by the "events generated" arrows directed at event-action mapping 930.

A presentation module may call actions on other presentation modules. Actions called by presentation module 910 are represented in FIG. 9 as arrows directed away module caller 920 and labeled "action calls sent." Module 910 may also perform actions in response to a call made from another module, frame or other presentation object. Actions called on presentation module 910 are represented by arrows directed at module actions block 940 labeled as "action calls received." Examples of actions include starting video, ending video, displaying an image, hiding an image and other actions. Performing actions in response to receiving a call initiating from another object is discussed below with respect to FIG. 10.

In some embodiments, events and actions may include a parameter. For example, a "final score( )" event may include an integer parameter which indicates a score. Similarly, a "start module video" action may include a parameter of time, indicating at what point the video should be started (e.g., a parameter value of ten may indicate the video should start ten seconds from the beginning).

In some embodiments, an action may be performing a rule. The rule may be implemented by code and have an input, engine and output. The rule input may specify a presentation module or global variable. The rule engine may state a condition or calculation that must be met in order for an output to occur. The rule output may comprise an action, another rule or a change in a variable. For example, a rule may comprise logic of "if score is more than five, start second frame." In this case, the score is the input, determining if the score is over five is the engine, and starting a second frame is the output. Rule logic may be saved as part of a module objects within a frame object.

Figure 10:
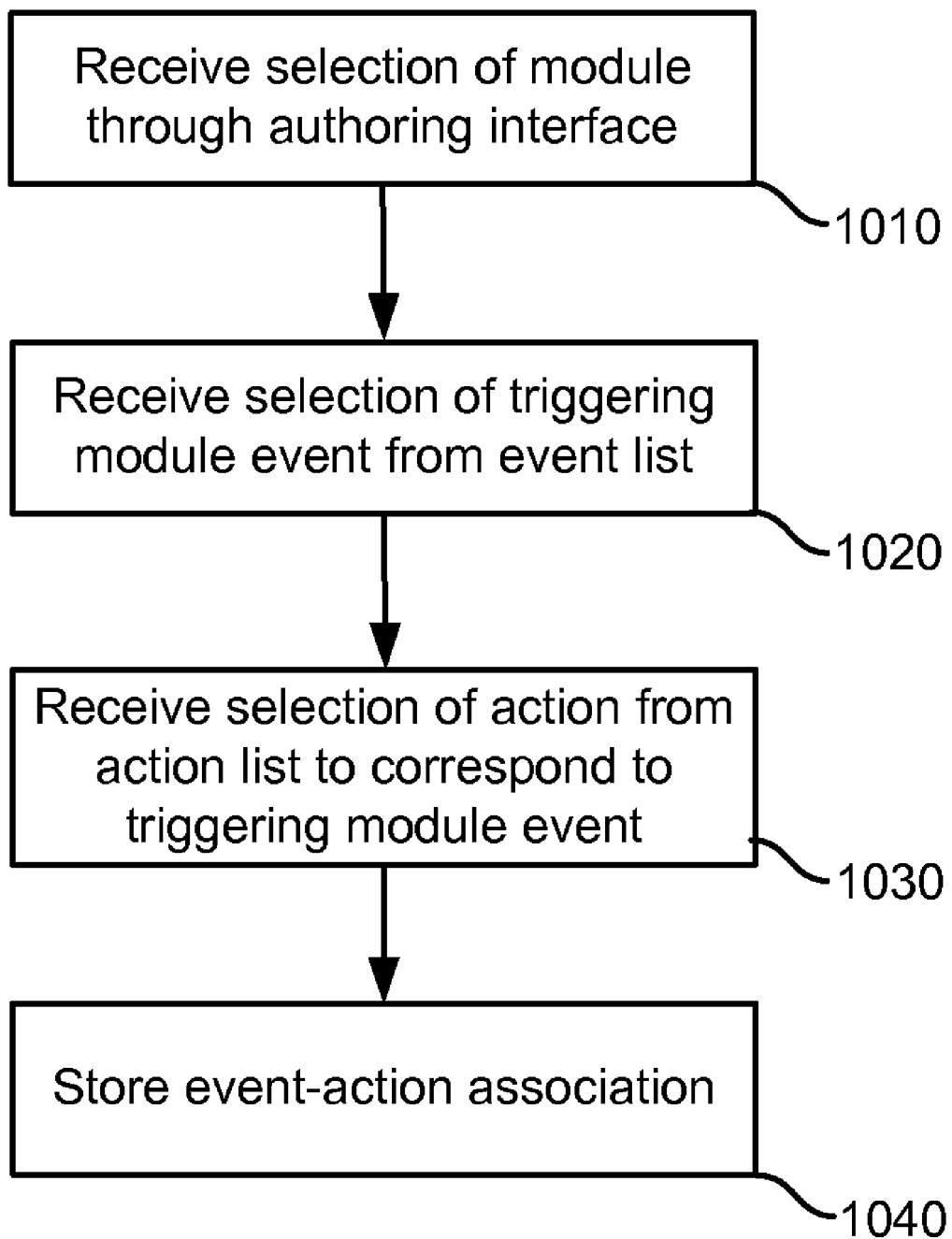
FIG. 10 is a flowchart of an embodiment of a process for associating a presentation module event to a presentation module action.

FIG. 10 is a flowchart of an embodiment of a process for associating a module event to a module action. In one embodiment, the flowchart of FIG. 10 provides more detail for step 845 of FIG. 8. First, a selection of a module is received through authoring interface 119 at step 1010. Next, input is received which selects a triggering module event from an event list at step 1020. The selected event will trigger an action by the module to be selected later in the process. In one embodiment, the triggering event may be selected from a list of events provided by authoring interface 119. This list of available triggering events may be provided in a drop-down menu or some other format. The events may be types of input that can be received by the module, types of internal events associated with the module that may occur, and other events. Examples of these events include right click, left click, expiration of a timer, end of video playback and other events.

After receiving a selection of a triggering module event, an action is selected to correspond to the selected event at step 1030. In one embodiment, in response to receiving a selection of an event, authoring interface 119 may provide a list of actions that the presentation module may perform. A user may select one of the listed actions to associate it with the event selected at step 1020. In some embodiments, upon selecting an event at step 1020, a user may drag the selected presentation module into another presentation module of the current frame, or into another frame. By dragging the current module into a second module, a user indicates that second module should be invoked when the selected event is triggered in the current module.

After receiving selection of the triggering event and corresponding module action, the event and action association are stored at step 1040. In one embodiment, the event-action data is stored within the frame object associated with the selected module. The event-action data includes the selected module, the triggering event, and the corresponding action the module will perform. Frame manager 246 saves the event-action data to the frame object during authoring and processes the events and actions during presentation playback.

Figure 11:
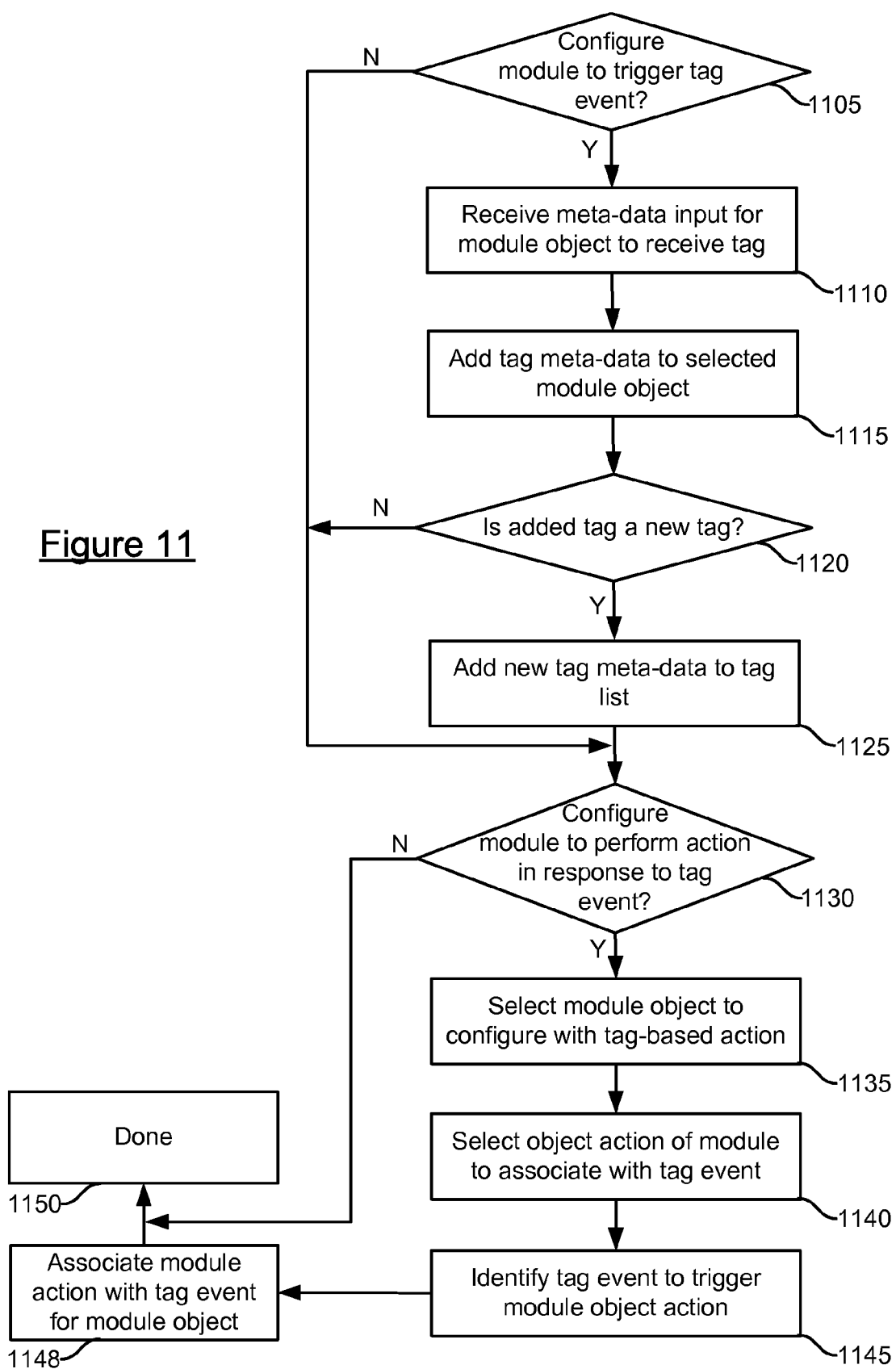
FIG. 11 is a flowchart of an embodiment of a process for associating a tag with a presentation object.

FIG. 11 is a flowchart of an embodiment of a process for associating a tag with a presentation object. In one embodiment, the process of FIG. 11 provides more detail for step 850 of the process of FIG. 8. The process of FIG. 11 may be considered in two parts. Steps 1105-1125 add tag meta-data to a presentation object, thereby enabling the object to trigger a tag event. A tag event occurs when the object having the tag meta-data is selected by a user during playback. Steps 1130-1145 configure a presentation object to perform an action in response to detecting a tag event. In some embodiments, the tag meta-data (tag data) configured in steps 1105-1125 may be added to a first module of a presentation. A second module of the presentation may then be configured in steps 1130-1145 to perform an action in response to a tag event associated with the tag data added to the first module. The tag data can be added to any module, and the corresponding action performed in response to the tag event is processed and carried out by an event handler (e.g., frame manager 246). As discussed in more detail below, the tag data contains no direct link between the first and second modules, or any information which identifies or calls one module by another For purposes of discussion, the process of FIG. 11 is discussed with reference to a module object. It is intended that the process of FIG. 11 may be used to configure action-event associations for a frame, activity or other presentation object as well.

The process of FIG. 11 begins with determining whether a module object should be configured to trigger a tag event at step 1105. In one embodiment, a user may provide input through authoring interface 119 indicating that a module should trigger a tag event. If the module is not to trigger a tag event, the process continues to step 1130. If input is received indicating that the module should trigger a tag event, the process of FIG. 11 continues to step 1110.

Meta-data is received for the module to include the tag at step 1110. The meta-data may include tag name data and optionally tag group data and be received through authoring interface 119. In one embodiment, presentation application 112 may maintain a list of tag names. When a user provides input selecting to add a tag to an object, authoring interface 119 provides a list of available tags to the user. The user may select a tag from the provided list or create a new tag. When creating a new tag, a user may type tag information into authoring interface 119. In some embodiments, more than one tag may be associated with a tag group. For example, several image modules may have a tag name of a country in which they provide an image for (e.g., tag names of "United States," "Afghanistan," and "Germany"). However, each of them may include tag group information of "country." To add more than one tag to a module, step 1110 can be performed two or more times before proceeding to step 1115.

Next, the tag meta-data is added to the module object at step 1115. The tag meta-data is added to the module object by frame manager 246. In one embodiment, the module object is in XML code. In this case, the tag meta-data is added to the XML code comprising the module object. After the tag meta-data is added to the module object, a determination is made as to whether the added tag is a new tag at step 1120. In one embodiment, authoring engine 114 compares the tag name added at step 1115 to tags contained in a tag list accessed by presentation application 112. In some embodiments, the tag list is stored as part of the presentation file. If the added tag is contained in the tag list, the process of FIG. 11 continues to step 1130. If the tag is not contained in the list, presentation application 112 adds the tag meta-data associated with the tag name to the tag name list at step 1125. The process of FIG. 11 then continues to step 1130.

A determination is made by authoring engine 114 as to whether a module should be configured to perform an action in response to a triggered tag event at step 1130. In one embodiment, a module action should be configured if input is received through authoring interface 119 indicating that a module should be configured accordingly. If no module is to be configured to perform an action in response to a tag event, the process of FIG. 11 continues to step 1150 where the process is done. If a module should be configured, the process of FIG. 11 continues to step 1135.

The module object to configure with the tag-based action is selected at step 1135. The module may be selected through authoring interface 119 provided by authoring engine 114. Next, a module action is selected to associate with the tag event at step 1140. In one embodiment, the action may be selected from a module action list. As discussed above, each module object includes a list of actions it may perform. The actions can be based on the media content associated with the module as well as other module features. For example, the actions may include start video, pause video, stop video, show image, hide image, start audio, end audio, show text, hide text, and other actions. Frame manager 246 may access the module action list from each module object and provide it in authoring interface 119. The list of module actions can be provided to a user in a drop down menu or in some other format.

After selecting a module action, a tag event is identified to trigger a module object action at step 1145. As discussed above, a tag event occurs when a module having tag meta-data is selected. When selected, the module provides its tag meta-data to frame manager 246. Frame manager 246 then determines if any other modules are configured to perform an action in response to a tag event for the particular tag meta-data. Thus, identifying a tag event in step 1145 includes identifying tag meta-data such that if another module with the tag meta-data is selected, the present module will perform an action in response to the selection. Thus, when a second module performs a tag action in response to a tag event triggered by a first module, the first and second modules do not communicate directly with each other and are not directly linked together. Rather, they are associated with the same meta-data.

Identifying a tag event at step 1145 may include receiving a selection of tag meta-data from a list of existing tag meta-data or receiving new tag meta-data. Each frame in a presentation maintains a list of the meta-data contained in the modules of the frame. Authoring engine 114 of presentation application 112 may access the meta-data list maintained in each frame object and provide the list through authoring interface 119. Authoring interface 119 may receive a selection of existing meta-data in the list or allow a user to type in new meta-data. If new tag meta-data is received at step 1145, the meta-data is added to the tag list maintained in the frame object as discussed above at step 1125.

Once the tag is identified, the module action selected at step 1140 is associated with the identified tag event at step 1148. In one embodiment, the association is performed by presentation application 112 automatically in response to completion of steps 1135-1145 by a user through authoring interface 119. The association of the tag event to the module action is maintained by frame manager 246. When the presentation is saved, tag event-action associations are saved within the frame object containing the modules involved with each association. After associating the object action to the selected tag, the process of FIG. 11 ends at step 1150.

Figure 12:
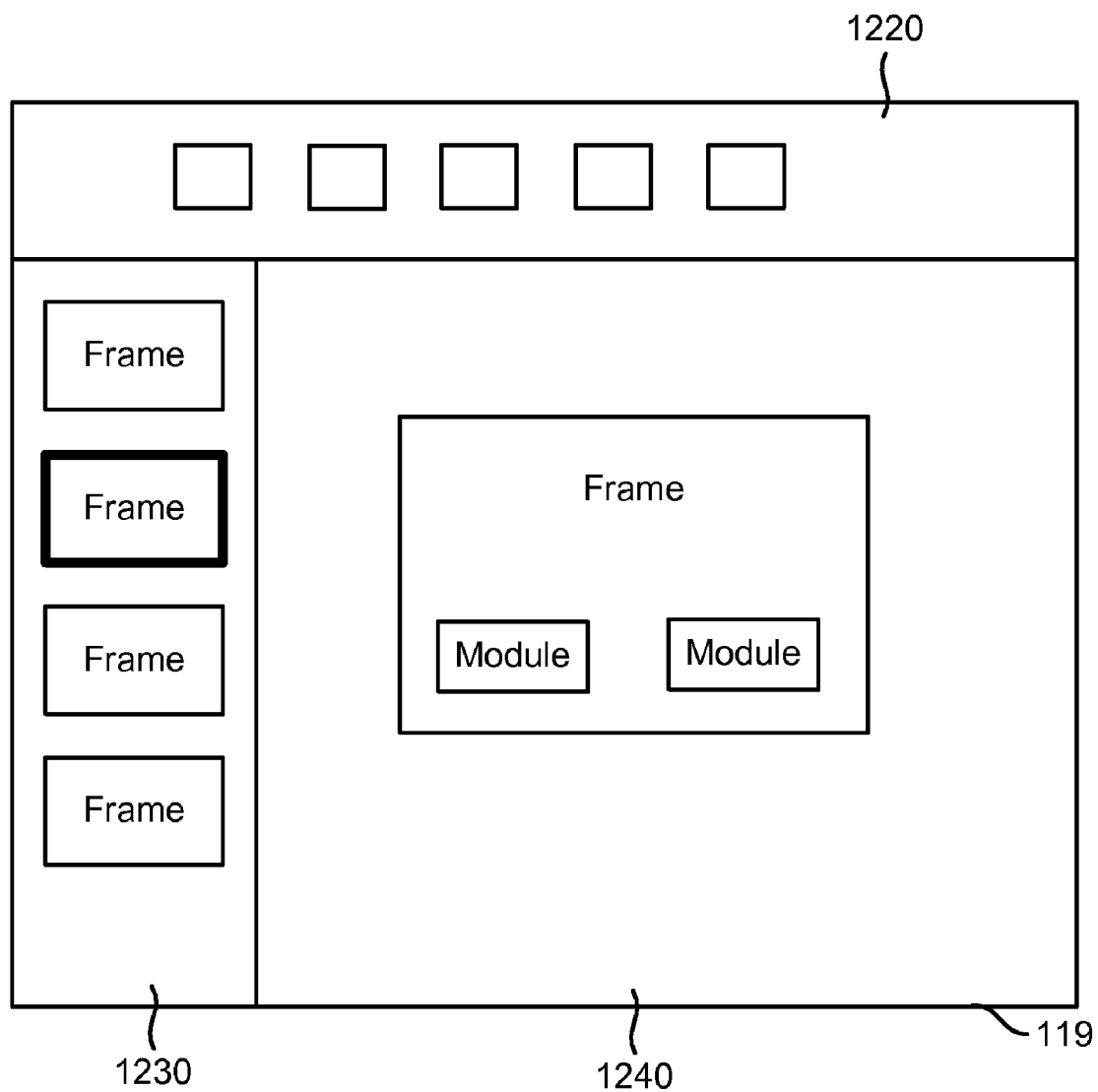
FIG. 12 is an example of an authoring interface.

FIG. 12 is an example of an authoring interface. In one embodiment, interface 119 of FIG. 12 provides more detail for authoring interface 119 of FIG. 1. Authoring interface 119 includes menu and toolbar window 1220, frame navigator window 1230 and work space window 1240. Menu bar and toolbar window 1220 may include one or more menus, buttons or toolbars which allow a user to enter input and otherwise manipulate interface 119. Menus may be associated with editing a presentation object, performing operations on a presentation file or presentation file (save, new, load and other operations), and other functions. Examples of buttons may include new activity, new frame, and new module, save as file, load new file, and other buttons.

Frame navigator 1230 provides a representation of the frames within the current activity. In one embodiment, all frames of a presentation are represented in frame navigator 1230. The frames represented are derived from the information provided by content manager 249. Selection of a frame in frame navigator 1230 causes that frame to be provided in workspace window 1240. In some embodiments, frame navigator 1230 provides a visual indicator on the frame representation associated with the frame currently being edited in workspace window 1240. The visual indicator may include a highlight or some other indicator. In the example embodiment illustrated in FIG. 12, frame navigator window 1230 shows four frames in the activity being authored. The second listed frame in window 1230 is highlighted, indicating that the frame is currently provided in workspace window 1240.

Work space window 1240 may allow a user to edit a selected presentation frame, a module within a selected frame, or some other presentation object. The frame being edited in work space window 1240 is the highlighted frame of frame navigator window 1230. The selected frame is presented in work space window 1240 with its corresponding presentation modules. In some embodiments, a module editing interface may be provided for each presentation module in the provided frame. For example, a module editing interface may provide a user with a list of actions that may be performed in response to detection of an event, a list of tags to associate with the module, and other data that can be used to configure a module. A selected frame and its corresponding presentation modules may be edited and/or modified as discussed above with respect to the flowchart of FIG. 8.

Figure 13A:
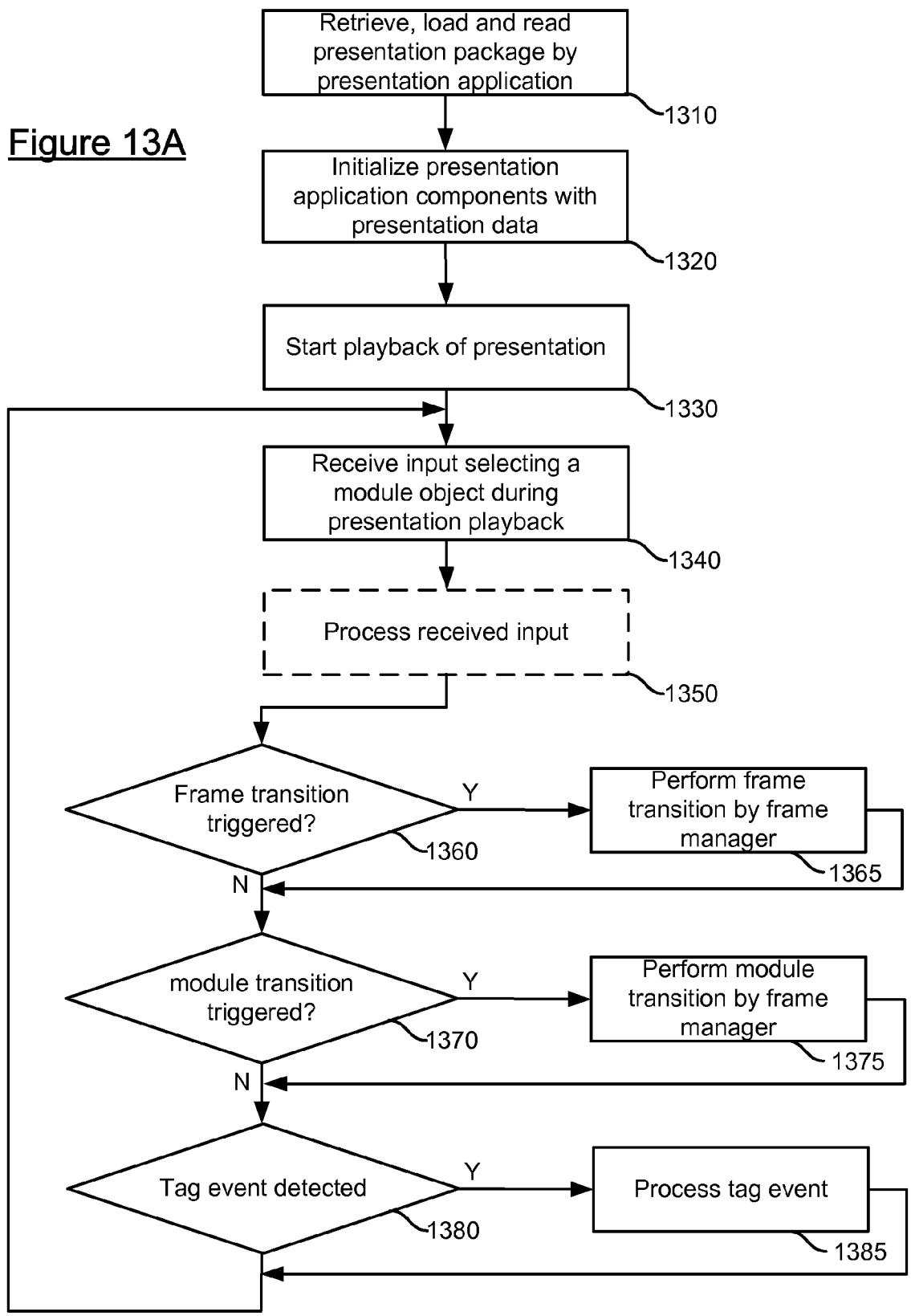
FIG. 13A is a flowchart of an embodiment of a process for playback of a presentation.

FIG. 13A is a flowchart of an embodiment of a process for playback of a presentation. In one embodiment, the flowchart at FIG. 13A may be performed by playback engine 116 of presentation application 112 and provides more detail for step 430 of FIG. 4. First, a presentation file may be retrieved, loaded and read by presentation application 112 at step 1310. In one embodiment, a user may run presentation application 112 and select to playback presentation file 118. The selected presentation file may be loaded and read by content manager 249. Reading the file may include retrieving the activity object data, frame object data and module object data from the file. As discussed above, each frame object contains the corresponding module object data for the modules contained in the particular frame. Content manager 249 reads the data and maintains the organization of modules within each frame and frames within each activity.

Components of presentation application 112 are then initialized with the retrieved presentation data at step 1320. In one embodiment, initialization may include content manager provides the retrieved presentation data to presentation manager 244. Presentation manager 244 may provide frame object data to frame manager 246 and activity object data to activity manager 242. For each module object in the presentation, frame manager 246 may call an initialization command. After calling this command, resources and a state value may be retrieved and/or determined for each presentation module. Resources may be retrieved from the presentation file itself, or from a location indicated within the presentation file. A state value may indicate a state at which the presentation module was saved. For example, if a presentation module includes a video, and half of the video had been previously viewed when the presentation was last saved, the state value would indicate this. In one embodiment, the state value would indicate the time into the video at which the video should be played (e.g., 120 seconds into the video). State values are stored by content manager 249 when generating a presentation file.

The presentation file is played at step 1330. In one embodiment, presentation manager 244 provides the initial activity object, initial frame object and initial module objects to frame manager 246. This initial content is then presented as the beginning of the presentation. After playback begins, input may be received selecting a module during presentation playback at step 1340. In some embodiments, the input may be received selecting a frame containing a module rather than a module itself. The input may include positioning a cursor over the module, providing a right click or left click selection of a module, double click selection of a module, or some other input.

After receiving input, the received input is processed by playback engine 116 at step 1350. This step is optional as indicated by the dashed line comprising step 1350 in the flowchart of FIG. 13A. Processing the input may include triggering a module event, implementing a module action, storing data, and other tasks. If processing the received user input includes triggering an event, an action may be performed in response to the triggered event. In some embodiments, one or more frame objects within a presentation may include a table of module event-actions. The table of module event-actions includes a pairing of module events and resulting actions performed by one or more other modules. The module event-action list differs from the tag event-action list in that a module event triggers an event for one or more modules identified in the list. A tag event-action list identifies modules that trigger an event for a specific tag and modules that perform an action in response to a particular tag event. The module action may be associated with the triggered event as discussed above with respect to the process of FIG. 10.

If a module selected by user input triggers a module event, module event data is provided from the module object to the frame object containing the module. The module event data may include the module name and the input received by the module which triggered the event. The frame object then communicates the module event data to frame manager 246. Frame manager 246 accesses the module action-event list for the relevant frame and determines what module within the frame is configured to perform an action in response to the module event. Frame manager 246 then initiates the action by sending a command to the module performing the action.

In some cases, information associated with the received input is stored and processed. This may be applicable for modules that provide a game with a score, a quiz wherein user answers in the form of a text string are processed, or other presentation module functions. In this case, the input may cause a counter to be incremented, an input string to be compared to a stored string, or some other task. In response to the processing of the input received, presentation application 112 may perform some action as discussed above.

After processing the input, a determination is made by playback engine 116 as to whether a frame transition is triggered at step 1360. In some cases, a triggered module event may cause a frame transition. The event may be triggered from the user input receive at step 1350 or from an internal event, such as the expiration of a timer, a video running until completion, or some other event. If a frame transition is triggered at step 1360, the frame transition is performed at step 1365. Frame transitions may be handled by frame manager 246 and transition manager 248. In one embodiment, performing a frame transition includes suspending the currently displayed frame by transition manager 248. While suspending the current frame, transition manager 248 may end the modules currently displayed in the current frame. If a module within the current frame is a persistent presentation module (and therefore should be displayed in the subsequent frame), the presentation module may be resumed once the new frame is initiated. After the current frame has been suspended, transition manager 248 retrieves the subsequent frame data and module data from frame manager 246, populates the presentation with the new frame and module data, and begins playback of the subsequent frame and modules contained therein. After performing a frame transition, the flowchart of FIG. 13A continues to step 1370. If no frame transition is to be performed, the process of FIG. 13A continues to step 1370.

A determination is made by playback engine 116 as to whether an activity transition is triggered at step 1370. Similar to a frame transition, an activity transition is triggered by an event triggered by user input or an internal event. If an activity transition is not triggered, the process of FIG. 13A continues to step 1380. If an activity transition is determined to be triggered, the activity transition is performed at step 1375. A transition between activities is performed by frame manger 246 and transition manager 248. Performing an activity transition includes suspending the current activity and corresponding frame objects and module objects contained in the activity by transition manager 248, retrieving subsequent activity data from activity manager 242 by transition manager 248, populating the presentation with the subsequent activity data, and starting playback of the subsequent activity. The subsequent activity data may include activity object data, frame object data for frames contained in the activity, and module object data for modules contained in each frame. The subsequent activity may include a home frame with one or more modules. In this case, populating and starting playback of the presentation with activity data includes loading the home frame data and module data into the presentation and providing the home frame during presentation playback. After performing an activity transition at step 1075, the process of FIG. 13A then continues to step 1380.

Playback engine 116 determines whether a tag event is detected at step 1380. A tag event may be detected if a module presented during presentation playback contains tag meta-data and is selected by a user. If no tag event is detected, the process of FIG. 13A continues to step 1340. If a tag event is detected, the tag event is processed at step 1385. Processing a tag event may include providing tag event data to frame manager 246, identifying modules configured to perform an action in response to the particular tag event, and performing the actions by the identified modules. Processing a tag event is discussed in more detail below with respect to FIG. 13B. After processing the tag event, the process of FIG. 13A returns to step 1340.

Figure 13B:
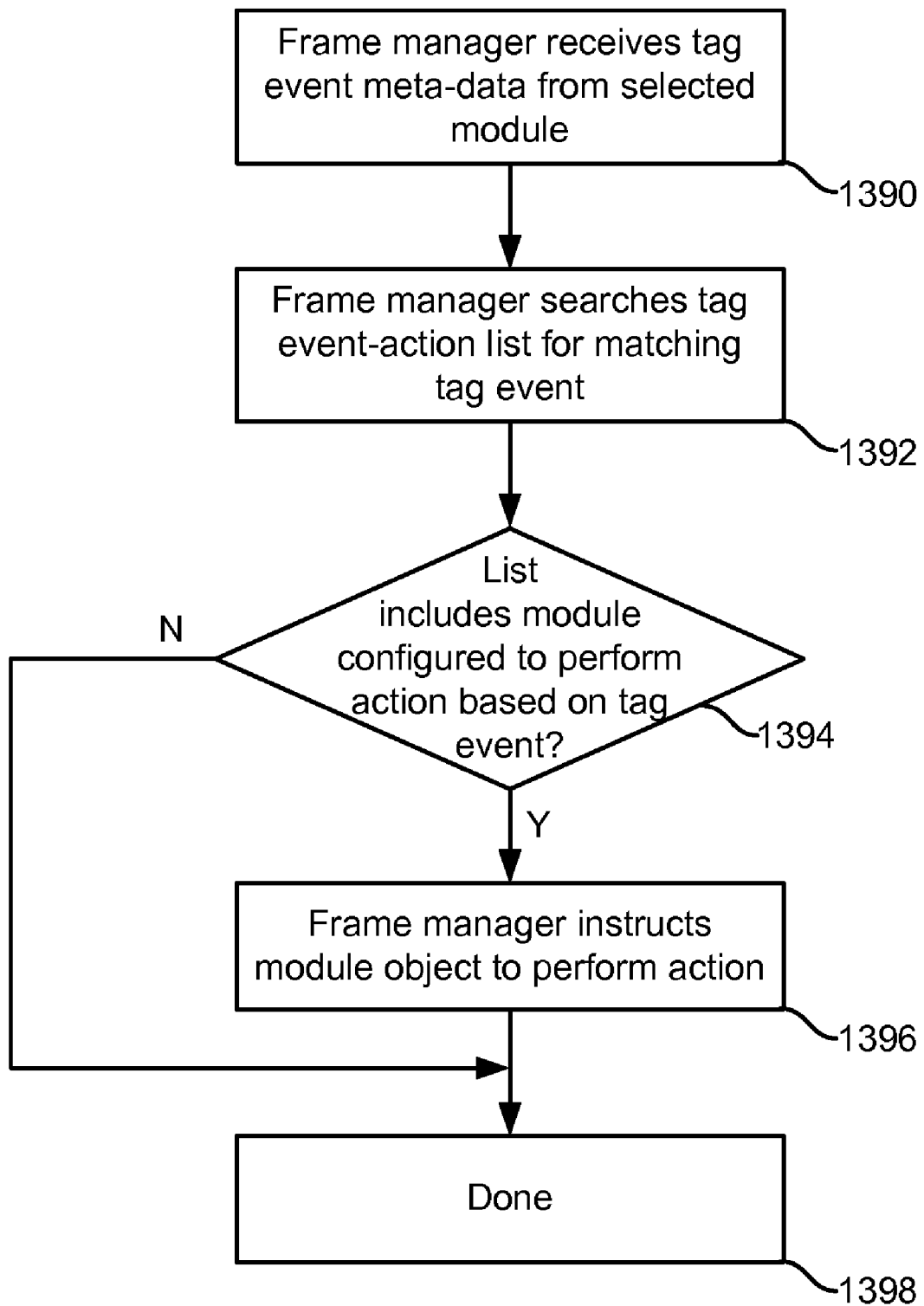
FIG. 13B is a flowchart of an embodiment of a process for processing tag events during presentation playback.

FIG. 13B illustrates a flowchart of an embodiment of a process for processing tag events during presentation playback. In one embodiment, the process of FIG. 13B provides more detail for step 1385 of FIG. 13A. First, frame manager 246 receives tag event meta-data from a selected module at step 1390. In one embodiment, frame manager 246 receives the meta-data indirectly from a module selected by a user during playback. Once selected, the module object provides tag event data to the frame object containing the module. The tag event data may include the meta-data contained in the module as well as an indication of the input received by the module (e.g., a cursor positioned over the module, a right click selection, a double right click selection, etc.). The frame object then provides the received tag event data to frame manager 246.

Frame manager 246 searches a tag event-action list for a matching tag event at step 1392. As discussed above, each frame object contains a list of tag event-actions for the modules within the frame. The list contains a list of tag events that may be triggered by the modules contained with the frame object and the actions performed by other modules contained in response to the particular tag event. Thus, at step 1392, frame manager 246 searches the tag event-action list for the tag event detected at step 1380 of FIG. 13A. Frame manager 246 then determines if the tag event-action list includes any module configured to perform an action in response to the detected tag event at step 1394. If no module is configured to perform an action in response to detecting the tag event, the process of FIG. 13B ends at step 1398. If a module is configured to perform an action in response to detecting the tag event, the process continues to step 1396.

Figure 14:
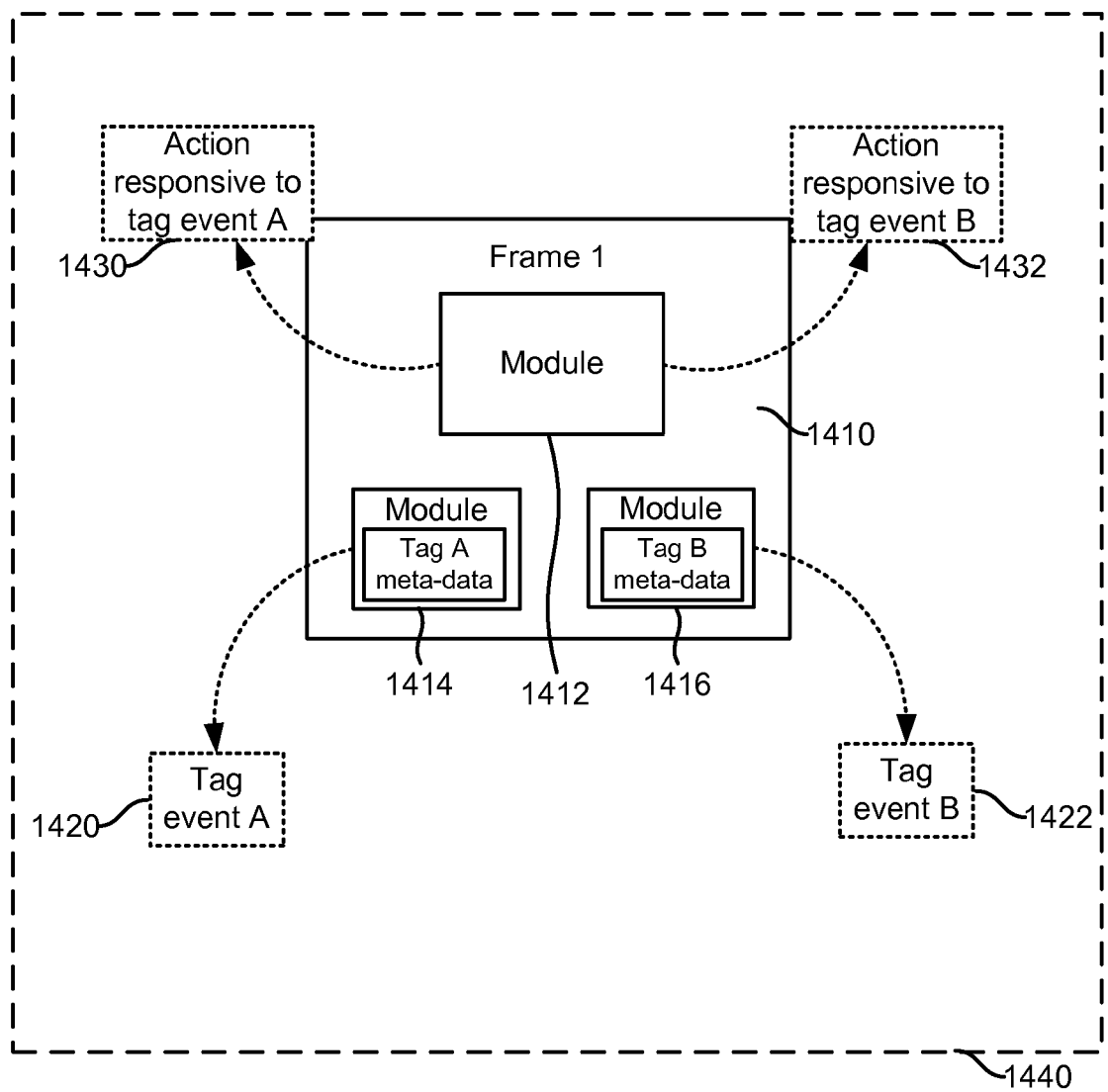
FIG. 14 is a block diagram of a symbolic representation of an activity configured with meta-data.

If a module is configured to perform an action in response to the detected tag event, frame manager 246 instructs the module object to perform an action at step 1396. In some embodiments, if the module is not already being displayed in the current frame of the presentation, the module is loaded into the presentation frame played. In some embodiments wherein the module is already loaded into the presentation, a particular action of the module may be performed. A particular action may include providing an image, hiding an image, changing from one displayed image to another, starting a video, ending a video, or some other action. A symbolic representation of a module that performs an action in response to a tag event is illustrated in FIG. 14 and discussed below. The process of FIG. 13B then ends at step 1398.

FIG. 14 is a block diagram of a symbolic representation of activity 1440 that is configured with tag meta-data. Activity 1440 includes a frame 1410. Frame 1410 of includes module 1412, 1414, and 1416. Modules 1414 and 1416 are configured to trigger tag events and module 1412 is triggered to perform an action in response to tag events. Specifically, module 1414 is configured with meta-data associated with tag A and module 1416 includes meta-data with tag event B. The meta-data for tags A and B may include any character string. Module 1412 is configured to perform an action when a tag event A is detected or a tag event B is detected. The action will be performed by module 1412 regardless of what module performs the action; it is the tag meta-data associated with the event that causes the action to be performed.

When a first module 1414 is selected, a tag event A 1420 is triggered. The tag event includes sending tag data for the tag event to frame manager 246. This is illustrated by the dotted line comprising tag event A 1420 in FIG. 14. When frame manager 246 receives the tag data, the tag event is considered detected. In response to tag event A being detected, frame manager 246 accesses a tag event-action table to determine if any modules are configured to perform an action in response to the detected tag event (an event with tag data "A"). If so, frame manager instructs the modules to perform the action. In FIG. 14, then instruction is a call to second module 1412 to perform an action 1430. This is represented as the dotted line comprising action 1430 in FIG. 14. Similarly, when module 1416 is selected, tag event B 1422 is triggered and ultimately causes module 1412 to perform action 1432.

Some examples of processing tag events and actions during presentation playback are now discussed. In a first example, a presentation may provide information for days of a week. The presentation may include a frame which consists of a first module displaying a timeline image and several other modules with other content. Each content module may be tagged with time meta-data and be associated with a different day of the week (tag names of "Monday," "Tuesday," etc., all in a tag group of "Time.") The timeline module may present images (such as an image of the word "Monday," "Tuesday," etc.) based on the tagged content module selected by a user. Thus, as a user selects a different content module having meta-data of a certain day of the week, a tag event associated with that module is triggered. Each tag event causes the timeline module to load and provide a different image portraying time information associated with the triggered tag event.

In another example, a presentation may provide information regarding different countries. The presentation may consist of a first frame featuring flags of different countries and several frames associated with a specific country. The flag frame may contain several modules, each containing an image of a different country's flag. Each of the other frames in the presentation provides information for a country associated with one of the flags. From a user point of view during playback, selecting a flag module from the flag frame initiates a frame corresponding to the selected flag. Once the frame corresponding to the selected flag has completed providing content to the user, the presentation may return to the frame containing the flags and await further user input.

To implement the flag-country presentation, each flag module may contain meta-data having a country name. The country frames may each be configured with a tag-based action. Thus, an Argentina flag module may be contained within the flag frame and be tagged with meta-data of "Argentina." When selected during playback, a tag event with tag meta-data "Argentina" is triggered. A frame regarding the country Argentina is then configured to perform a tag-based action for a tag event having meta-data of "Argentina." The action may be to begin playback of the frame. Thus, in this case, the tag-based action is to present a new frame for playback in the presentation. After playback of the Argentina frame, the country flag frame may again be presented during playback until a user selects another module of the frame.

In some embodiments, the playback of a presentation may be filtered using one or more tags. For example, a user may playback portions of a presentation associated with a particular tag name or group. By selecting a tag name or group through presentation application 112 at presentation runtime, only frames and modules associated with the specified tags will be provided during playback.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. One or more processor readable storage devices having processor readable code embodied on said processor readable storage devices, said processor readable code for programming one or more processors to perform a method comprising:

providing a user interface for configuring a first slide and a second slide of a multi-media presentation, the first slide including first media content and the second slide including second media content;

receiving a first input through the user interface to associate meta-data with the first media content such that selection of the first media content during playback of the first slide of the multi-media presentation triggers a first tag event that contains the meta-data; and receiving a second input through the user interface to perform an action associated with the second media content in response to the first tag event, wherein said performing the action associated with the second media content includes:

loading the second slide of the multi-media presentation; and displaying the second media content in the first second slide of the multi-media presentation.

2. The one or more processor readable storage devices of claim 1, wherein said step of receiving a first input includes:

providing a list of meta-data tags in a second user interface; and receiving selection of one of the meta-data tags provided in the list.

3. The one or more processor readable storage devices of claim 1, wherein, during playback of the first slide, the first media content is an image.

4. The one or more processor readable storage devices of claim 3, wherein, during playback of the first second slide, the second media content is a video, whereby display of the video begins upon selection of the image.

5. The one or more processor readable storage devices of claim 1, wherein the second media content is a video file, said step of receiving a second input comprises:

receiving a second input designating to play the video file in response to triggering the first tag event.

6. An apparatus for processing data, comprising:

a communication interface;

a storage device; and one or more processors in communication with said storage device and said communication interface, said one or more processors perform a method for navigating within a multi-media presentation comprising:

displaying first content in the multi-media presentation, the first content associated with first meta-data;

detecting the selection of the first content displayed in the multi-media presentation;

automatically selecting second content in the multi-media presentation in response to detecting the selection of the first content; comprising:

retrieving the first meta-data associated with the first content;

identifying a second meta-data matching the first meta-data; and identifying a second content having the second meta-data that is identical to the first meta-data; and displaying the second content in the multi-media presentation.

7. The apparatus of claim 6, wherein the second content is a video, the step of displaying comprises:

displaying the video in the multi-media presentation.

8. The apparatus of claim 7, wherein the first content is displayed in a first slide of the multi-media presentation and the second content is displayed in a second slide of the multi-media presentation.

9. The apparatus of claim 6, wherein the step of detecting the selection of the first content comprises:

detecting user input selecting the displayed first content.

10. A computer-implemented method for presenting content within a multi-media presentation, comprising:

displaying first content in the multi-media presentation, the first content associated with first meta-data;

detecting selection of the first content in the multi-media presentation;

automatically searching for second content in the multi-media presentation based on the detecting step, comprising:

retrieving the first meta-data associated with the first content;

identifying second meta-data matching the first meta-data; and identifying second content having second meta-data that is identical to the first meta-data; and performing an action associated with the second content in the multi-media presentation.

11. The method of claim 10, wherein the second content is a video, the step of performing an action comprises:

displaying the video in the multi-media presentation.

12. The method of claim 10, wherein the multi-media presentation includes a first slide and a second slide, the first content is displayed in the first slide and the second content is displayed in the second slide, the step of performing an action associated with the second content comprises:

loading the second slide of the multi-media presentation; and displaying the second content in the second slide of the multi-media presentation.

13. The method of claim 12, further comprising:

returning to the first slide of the multi-media presentation upon completion of displaying the second content in the second slide of the multi-media presentation.

14. The method of claim 10, wherein the step of detecting selection of the first content comprises:

detecting expiration of a predetermined period of time.

* * * * *

UNITED STATES PATENT AND TRADEMARK OFFICE
CERTIFICATE OF CORRECTION

| | | |
|---|---|---|
| PATENT NO. | : 7,979,801 B2 | Page 1 of 1 |
| APPLICATION NO. | : 11/428074 | |
| DATED | : July 12, 2011 | |
| INVENTOR(S) | : Vinay Krishnaswamy et al. | |

It is certified that error appears in the above-identified patent and that said Letters Patent is hereby corrected as shown below:

In column 22, line 13, in Claim 1, after "in the" delete "first".

Signed and Sealed this
Thirtieth Day of August, 2011

David J. Kappos
*Director of the United States Patent and Trademark Office*